United States Patent
Dai et al.

(10) Patent No.: US 11,838,079 B2
(45) Date of Patent: Dec. 5, 2023

(54) MIMO SYSTEMS

(71) Applicant: BRITISH TELECOMMUNICATIONS PUBLIC LIMITED COMPANY, London (GB)

(72) Inventors: Linglong Dai, London (GB); Bichai Wang, London (GB); Richard Mackenzie, London (GB); Mo Hao, London (GB); Xinyu Gao, London (GB)

(73) Assignee: British Telecommunications Public Limited Company, London (GB)

( * ) Notice: Subject to any disclaimer, the term of this patent is extended or adjusted under 35 U.S.C. 154(b) by 227 days.

(21) Appl. No.: 17/250,977

(22) PCT Filed: Sep. 13, 2019

(86) PCT No.: PCT/EP2019/074532
§ 371 (c)(1),
(2) Date: Apr. 6, 2021

(87) PCT Pub. No.: WO2020/074213
PCT Pub. Date: Apr. 16, 2020

(65) Prior Publication Data
US 2021/0344393 A1 Nov. 4, 2021

(30) Foreign Application Priority Data
Oct. 9, 2018 (CN) .......................... 201811171585.8

(51) Int. Cl.
*H04B 7/0456* (2017.01)
*H01Q 3/24* (2006.01)
(Continued)

(52) U.S. Cl.
CPC ............. *H04B 7/0469* (2013.01); *H01Q 3/24* (2013.01); *H01Q 3/38* (2013.01); *H01Q 15/02* (2013.01)

(58) Field of Classification Search
CPC .......... H04B 7/0469; H01Q 3/24; H01Q 3/38; H01Q 15/02
See application file for complete search history.

(56) References Cited

U.S. PATENT DOCUMENTS 9,967,014 B1   5/2018  Park et al.
10,714,836 B1* 7/2020  Karabacak ........... H04B 7/0868
(Continued)

FOREIGN PATENT DOCUMENTS

CN        107809274 A    3/2018
WO    WO-2013045012 A1   4/2013

OTHER PUBLICATIONS

Ahamed Irfan., et al., "A Survey on Hybrid Beamforming Techniques in 5G: Architecture and System Model Perspectives", IEEE Communications Surveys & Tutorials, vol. 20, No. 4, Jun. 4, 2018 (Jun. 4, 2018), pp. 3060-3097.

(Continued)

*Primary Examiner* — Jaison Joseph
(74) *Attorney, Agent, or Firm* — Patterson Thuente IP

(57) ABSTRACT

According to the present disclosure there is provided a multiple-input-multiple-output (MIMO) transmitter for transmitting wireless communication signals over a communication channel to a receiver, the transmitter including a digital signal processor configured to perform pre-coding on a plurality $N_s$ of data streams; a plurality $N_{RF}$ of radio-frequency (RF) chains each configured to pass a pre-coded data stream from the digital signal processor to generate a signal representing that data stream; a lens antenna array comprising an array of $N_T$ antenna elements; and a selecting unit coupled between the plurality $N_{RF}$ of RF chains and the (Continued)

lens antenna array, the selecting unit including a plurality of separate coupling units each configured to couple a respective RF chain to a selective sub-array of $N_T^{B_{RF}}$ antenna elements concurrently for transmitting the signal representing the data stream passed through that RF chain.

23 Claims, 8 Drawing Sheets

(51) Int. Cl.
*H01Q 3/38* (2006.01)
*H01Q 15/02* (2006.01)

(56) References Cited

U.S. PATENT DOCUMENTS

| | | | |
|---|---|---|---|
| 10,848,204 B2* | 11/2020 | Almasi | H04B 7/024 |
| 10,897,286 B2* | 1/2021 | Liang | H04B 7/0452 |
| 10,950,937 B2* | 3/2021 | Ko | H01Q 3/38 |
| 11,438,046 B2 | 9/2022 | Dai et al. | |
| 11,509,365 B1* | 11/2022 | Karabacak | H04B 7/0695 |
| 2017/0062948 A1* | 3/2017 | Artemenko | H01Q 9/065 |
| 2018/0083672 A1 | 3/2018 | Alexander et al. | |
| 2019/0028166 A1 | 1/2019 | Freedman et al. | |
| 2019/0319355 A1* | 10/2019 | Ko | H01Q 15/10 |
| 2019/0319363 A1* | 10/2019 | Ko | H01Q 21/0031 |
| 2019/0356359 A1* | 11/2019 | Almasi | H04B 7/0695 |
| 2019/0393948 A1* | 12/2019 | Zhao | H04B 7/0619 |
| 2020/0028556 A1* | 1/2020 | Inoue | H04B 7/088 |
| 2020/0112378 A1* | 4/2020 | Holzheimer | H04B 10/691 |
| 2021/0226670 A1* | 7/2021 | Almasi | H04B 7/024 |
| 2021/0344393 A1* | 11/2021 | Dai | H04B 7/088 |
| 2022/0131578 A1* | 4/2022 | Junttila | H01Q 3/40 |

OTHER PUBLICATIONS

Bogale T.E., et al., "On the Number of RF Chains and Phase Shifters, and Scheduling Design With Hybrid Analog-Digital Beamforming," IEEE Transactions On Wireless Communications, IEEE Service Center, vol. 15, No. 5, May 1, 2016 (May 1, 2016), pp. 3311-3326.
Brady J., et al., "Beamspace MIMO for millimeter-wave communications: System architecture, modeling, analysis, and measurements," IEEE Transactions On Antennas and Propagation, vol. 61, No. 7, Jul. 2013, pp. 3814-3827.
Brady J.H., et al., "Wideband Communication with high-dimensional Arrays: New results and Transceiver Architectures," IEEE ICC Workshops, Jun. 2015, pp. 1042-1047.
Gao X., et al., "Energy-Efficient Hybrid Analog and Digital Precoding for MmWave MIMO Systems With Large Antenna Arrays," IEEE Journal on Selected Areas in Communications, vol. 34, No. 4, Apr. 2016, pp. 998-1009.
Gao X., et al., "Low RF-Complexity Technologies to Enable Millimetre-Wave MIMO with Large Antenna Arrau for 5G Wireless Communications," IEEE Communications Magazine, vol. 56, No. 4, Apr. 1, 2018 (Apr. 1, 2018), pp. 211-217.
Garcia-Rodriguez A., et al., "Reduced Switching Connectivity for Large Scale Antenna Selection," IEEE Transactions On Communications, IEEE Service Centre, vol. 65, No. 5, May 2017, pp. 2250-2263.
International Preliminary Report on Patentability for Application No. PCT/EP2019/074532, dated Feb. 10, 2021, 24 pages.
International Search Report and Written Opinion for Application No. PCT/EP2019/074532, dated Jan. 29, 2020, 20 pages.
Invitation to Pay Additional Fees with Partial International Search for Application No. PCT/EP2019/074532dated Nov. 18, 2019, 16 pages.
Li X., et al., "Statistical 3-D Beamforming for Large-Scale MIMO Downlink System Over Rician Fading Channels," IEEE Transactions On Communications, vol. 64, No. 4, Apr. 1, 2016, pp. 1529-1543.
Linglong D., et al., "Near-optimal hybrid analog and digital precoding for downlink mmWa e Massi e MIMO systems", 2015 IEEE International Conference On Communications (ICC), IEEE, Jun. 8, 2015 (Jun. 8, 2015), pp. 1334-1339.
Second Written Opinion of the International Preliminary Examining Authority for Application No. PCT/EP2019/074532, dated Dec. 3, 2020, 12 pages.
Zeng Y., et al., Electromagnetic lens-focusing antenna enabled massive MIMO: Performance improvement and cost reduction, IEEE Journal On Selected Areas in Communications, vol. 32, No. 6, Jun. 2014, pp. 1194-1206.
International Preliminary Report on Patentability for Application No. PCT/EP2020/059764, dated Jul. 15, 2021, 20 pages.
International Search Report and Written Opinion for Application No. PCT/EP2020/059764, dated Jun. 16, 2020, 12 pages.
Khawaja W., et al., "UAV Air-to-Ground Channel Characterization for mm Wave Systems," 2017, IEEE 86th, 978-1-5090-5935-5/17/ $31.00, 5 pages.
Liu W., et al., "Partially-Activated Conjugate Beamforming for LoS Massive MIMO Communications," DOI 10.1109/ACCESS.2018. 2872953, IEEE Access, 9 pages.
Payami S., et al., "Phase Shifters Versus Switches: An Energy Efficiency Perspective on Hybrid Beamforming," Feb. 2019, IEEE Wireless Communications Letters, vol. 8, No. 1, 4 pages.
Stein S., et al., "Hybrid Analog-Digital Beamforming for Massive MIMO Systems," Dec. 10, 2017, arXiv:1712.03485v1, 13 pages.
Written Opinion for Application No. PCT/EP2020/059764, dated Feb. 24, 2021, 8 pages.
Wu S., et al., "Reconfigurable Hybrid Beamforming for Dual-Polarized mm Wave MIMO Channels: Stochastic Channel Modeling and Architectural Adaptation Methods", IEEE Transactions On Communications, Feb. 2018, vol. 66, No. 2, XP055682361, Piscataway, NJ. USA, ISSN: 0090-6778, DOI: 10.1 1 O9/TCOMM.201 7.2762689, pp. 741-755.
Xue X., et al., "Relay Hybrid Precoding Design in Millimeter-Wave Massive MIMO Systems," 2018, IEEE, DOI 10.1109/TSP.2018. 2799201, 16 pages.

* cited by examiner

MIMO SYSTEMS

PRIORITY CLAIM

The present application is a National Phase entry of PCT Application No. PCT/EP2019/074532, filed Sep. 13, 2019, which claims priority from CN Patent Application No. 201811171585.8, filed Oct. 9, 2018, which is hereby fully incorporated herein by reference.

TECHNICAL FIELD

This disclosure relates to MIMO systems.

BACKGROUND

There has been increasing interest in millimeter-wave (mmWave) wireless communications systems due to their promise for meeting increasing bandwidth requirements of wireless devices. MmWave systems typically operate in the frequency band of 30-300 GHz. This is a much larger frequency band than the sub-6 GHz band currently used for Long Term Evolution (LTE) network and consequently larger bandwidths can be supported compared to those that can currently be supported with existing systems operating in the sub-6 GHz band.

One problem associated with mmWave communications is the relatively high free-space path loss that can be experienced. This high path loss can cause heavy attenuation in signals that experience blockages or that are communicated over long distances.

An approach to overcome this problem is to implement mmWave communications within a multiple-input-multiple-output (MIMO) system. The relatively short wavelengths of mmWave communications enables the antenna spacing of the MIMO system to be reduced and consequently enables a relatively large antenna array (containing e.g. 256 to 1024 antenna elements) to be packed in a relatively small physical size compared to what is achievable when operating in the sub-6 GHz band. These large antenna arrays are able to effectively compensate the high path loss induced by the higher frequency communications of mmWave.

Despite this, challenges remain to implement mmWave MIMO systems in practice.

Traditionally, MIMO systems are implemented with full digital precoding. An example MIMO transmitter with full digital precoding is shown in FIG. 1.

The transmitter 100 comprises a digital precoder 102 and a plurality of radio frequency (RF) chains (denoted generally at 104) coupled to the digital precoder 102. Each RF chain is coupled to an antenna (denoted generally at 108). In the example shown here, each RF chain is coupled to a respective antenna by an amplifier. The amplifiers are denoted generally at 106.

The digital precoder 102 receives a plurality of data streams, denoted generally at 110, and operates to control the amplitude and phase of each received data stream to achieve a transmitted beam from the antennas 108 with a desired direction and gain. The data streams, once pre-coded, are passed through the RF chains 104. Each RF chain may support a single data stream. The RF chains operate to convert the digitally pre-coded data streams into analog signals for transmission by the antennas 108. Each RF chain typically includes transceiver circuitry for generating the analog signals from the received digitally pre-coded data streams. The transceiver circuitry might include, for examples, digital-to-analog (DAC) converters, mixers and frequency converters. The output signals generated by each RF chain are then amplified by a respective amplifier and transmitted from a respective antenna.

Full digital precoding provides a high level of design choice and enables high data rates and low interference between different data streams to be achieved. However, it also typically requires a dedicated RF chain for each antenna. For mmWave MIMO systems, where the number of antennas is typically large as explained above, this requirement results in undesirably high hardware costs and power consumption.

SUMMARY

According to the present disclosure there is provided a multiple-input-multiple-output (MIMO) transmitter for transmitting wireless communication signals over a communication channel to a receiver, the transmitter comprising: a digital signal processor configured to perform pre-coding on a plurality $N_s$ of data streams; a plurality $N_{RF}$ of radio-frequency (RF) chains each configured to pass a pre-coded data stream from the digital signal processor to generate a signal representing that data stream; a lens antenna array comprising an array of $N_T$ antenna elements; and a selecting unit coupled between the plurality $N_{RF}$ of RF chains and the lens antenna array, the selecting unit comprising a plurality of separate coupling units each configured to couple a respective RF chain to a selective sub-array of $N_T^{B_{RF}}$ antenna elements concurrently for transmitting the signal representing the data stream passed through that RF chain.

The selecting unit may comprise $N_{RF}$ coupling units, each coupling unit coupled to a respective RF chain.

Each coupling unit may comprise a set of switching elements for coupling the respective RF chain to a selective sub-array of $N_T^{B_{RF}}$ of antenna elements concurrently.

Each switching element in a set of switching elements corresponding to an RF chain may couple that RF chain to a respective antenna element.

Each set of switching elements may be formed of $$N_T^{B_{RF}} = \left\lceil \frac{N_T B}{2 f_c} \right\rceil$$

switching elements, where B is the bandwidth of the channel in Hertz, and $f_c = c/2d$, where c is the speed of light in meters per second and d is the spacing between successive antenna elements in meters.

Each coupling unit may further comprise a set of phase shifter modules configured to adjust the amplitude and/or phase of each selected wireless communication signal to be communicated via that RF chain.

The set of phase shifter modules of each coupling unit may be coupled between the respective RF chain and the set of switching elements for that coupling unit.

The number of phase shifter modules in each coupling unit may be equal to the number of switching elements in that coupling unit.

Each coupling unit may contain $$N_T^{B_{RF}} = \left\lceil \frac{N_T B}{2 f_c} \right\rceil$$

phase shifter modules, where B is the bandwidth of the channel in Hertz, and $f_c=c/2\,d$, where c is the speed of light in meters per second and d is the antenna spacing in meters.

Each phase shifter module may comprises two phase shifters.

The number of data streams may be less than or equal to the number of RF chains.

The number of RF chains may be less than the number of antenna elements in the antenna lens array.

The transmitter may further comprise a controller configured to control the set of switching elements in each coupling unit to select the sub-array of $N_T^{B_{RF}}$ antenna elements to be coupled to the respective RF chain.

The controller may be configured to select the sub-array of $N_T^{B_{RF}}$ antenna elements to be coupled to each RF chain from the $N_T^B$ largest diagonal elements of $\Sigma_{k=1}^K \tilde{H}^H[k]\tilde{H}[k]$, where K is the number of sub-carriers of the MIMO transmitter, $\tilde{H}[k]$ is the beamspace channel between the transmitter and a receiver and $N_T^B = N_T^{B_{RF}} \cdot N_{RF}$.

$\tilde{H}[k] = U_R^H H[k] U_T$, where $U_T$ and $U_R$ are the spatial discrete Fourier transform matrices represented by the lens antenna array at the transmitted and a lens antenna array at the receiver.

The set of phase shifter modules for each of a sequence of coupling units may apply phase shift values determined from phase shift values applied by a set of phase shifter modules for a previous coupling unit in the sequence.

The set of phase shifter modules for the previous coupling unit in the sequence may optimize the data rate achievable by the sub-array of antenna elements coupled to that coupling unit.

The set of phase shifter modules for a coupling unit n in the subset of coupling units may apply phase shift values indicated by a vector $f_{RFn}^{opt}$ determined according to the equation $$f_{RFn}^{opt} = \underset{f_{RFn}}{\operatorname{argmax}} \log_2\left(1 + \frac{\rho}{\sigma^2 N_s} f_{RFn}^H G_n f_{RFn}\right),$$

where $\rho$ is the average received power at the receiver, $\sigma^2$ is the variance of the noise in the signal received at the receiver, $G_n = H^H T_n^{-1} H$, $$T_n = I_{N_{RF}} + \frac{\rho}{\sigma^2 N_{RF}} Q F_{RFn-1} F_{RFn-1}^H Q,$$

$I_{N_{RF}}$ is an identity matrix, $F_{RFn-1}$ is a sub-matrix of a matrix of phase values $F_{RF}$ formed by removing the n'th column $f_{RFn}$ and Q is a matrix formed from a decomposition of a matrix $R = Q^H Q$, where $$R = \frac{1}{K}\sum_{k=1}^K \tilde{H}_r^H[k]\overline{\tilde{H}_r}[k]$$

and $\widetilde{H_r}[k]$ is a reduced-dimension beamspace channel after sub-arrays of antenna elements have been selected for each coupling unit and K is the number of sub-carriers over which signals are transmitted.

According to a second aspect of the present disclosure there is provided a multiple-input-multiple-output (MIMO) receiver for receiving wireless communication signals over a communication channel, the transmitter comprising: a lens antenna array comprising a set of $N_T$ antenna elements each arranged to receive a wireless communication signal; a selecting unit coupled to the lens antenna array, the selecting unit comprising a plurality of separate coupling units each configured to couple to a selective sub-array of $N_R^{B_{RF}}$ antenna elements concurrently to select $N_R^{B_{RF}}$ received wireless communication signals; a plurality $N_{RF}$ of radio-frequency (RF) chains each coupled to a respective coupling unit, each RF chain being configured to pass a signal received from its respective coupling unit to generate a digital signal; and a digital signal processor configured to receive the digital signals generated from each RF chain and to perform combining of those signals to generate a plurality $N_s$ of data streams.

The selecting unit may comprise $N_{RF}$ coupling units, each coupling unit coupled to a respective RF chain.

Each coupling unit may comprise a set of switching elements for coupling the respective RF chain to a selective subset of $N_R^{B_{RF}}$ of antenna elements concurrently.

Each switching element in a set of switching elements corresponding to an RF chain may couple that RF chain to a respective antenna element.

Each set of switching elements may be formed of $$N_R^{B_{RF}} = \left\lceil \frac{N_T B}{2 f_c} \right\rceil$$

switching elements, where B is the bandwidth of the channel in Hertz, and $f_c = c/2\,d$, where c is the speed of light in meters per second and d is the spacing between successive antenna elements in meters.

Each coupling unit may further comprise a set of phase shifter modules configured to adjust the amplitude and/or phase of each selected received wireless communication signal.

The set of phase shifter modules of each coupling unit may be coupled between the respective RF chain and the set of switching elements for that coupling unit.

The number of phase shifter modules in each coupling unit may be equal to the number of switching elements in that coupling unit.

Each coupling unit may contain $$N_R^{B_{RF}} = \left\lceil \frac{N_T B}{2 f_c} \right\rceil$$

phase shifter modules, where B is the bandwidth of the channel in Hertz, and $f_c = c/2\,d$, where c is the speed of light in meters per second and d is the antenna spacing in meters.

Each phase shifter module may comprises two phase shifters.

The number of data streams may be less than or equal to the number of RF chains.

The number of RF chains may be less than the number of antenna elements in the antenna lens array.

The receiver may further comprise a controller configured to control the set of switching elements in each coupling unit to select the sub-array of $N_R^{B_{RF}}$ antenna elements to be coupled to the respective RF chain.

According to a third aspect of the present disclosure there is provided a MIMO system comprising a MIMO transmitter as described according to any of the examples herein and a MIMO receiver as described according to any of the examples herein.

According to a fourth aspect of the present disclosure there is provided a method of selecting a sub-array of antennas to be coupled to each RF chain of a transmitter according to any of the examples herein, the method comprising: selecting the $N_T^B$ largest diagonal elements of $\Sigma_{k=1}^K \tilde{H}^H[k]\tilde{H}[k]$ to form a vector $S_T$ indicating the $N_T^B$ most powerful beams transmitted by the lens antenna array of the transmitter, where K is the number of sub-carriers of the MIMO transmitter, $\tilde{H}[k]$ is the beamspace channel between the transmitter and a receiver and $N_T^B = N_T^{B_{RF}} \cdot N_{RF}^T$, where $N_T^{B_{RF}}$ is the number of antenna elements in each sub-array and $N_{RF}^T$ is the number of RF chains in the transmitter.

According to a fifth aspect of the present disclosure there is provided a method of selecting a sub-array of antennas to be coupled to each RF chain of a transmitter according to any of the examples herein and a receiver according to any of the examples herein, the method comprising: selecting the $N_T^B$ largest diagonal elements of $\Sigma_{k=1}^K \tilde{H}^H[k]\tilde{H}[k]$ to form a vector $S_T$ indicating the $N_T^B$ most powerful beams transmitted by the lens antenna array of the transmitter, where K is the number of sub-carriers of the MIMO transmitter, $\tilde{H}[k]$ is the beamspace channel between the transmitter and the receiver and $N_T^B = N_T^{B_{RF}} \cdot N_{RF}^T$, where $N_T^{B_{RF}}$ is the number of antenna elements in each sub-array and $N_{RF}^T$ is the number of RF chains in the transmitter and selecting the $N_R^B$ largest diagonal elements of $\Sigma_{k=1}^K \tilde{H}^H[k]s_T s_T^H \tilde{H}[k]$ to form a vector $S_R$ indicating the $N_R^B$ most powerful beams received by the lens antenna array of the receiver.

According to a sixth aspect of the present disclosure there is provided a method of configuring the set of phase shifter modules for the plurality of coupling units of the MIMO transmitter according to the examples herein, comprising: determining the phase shift values applied by the set of phase shifter modules for a sequence of coupling units, wherein the phase shift values applied by the set of phase shifter modules of a coupling unit in the sequence is determined from phase shift values applied by the set of phase shifter modules of the previous coupling unit in the sequence.

The set of phase shifter modules for the previous coupling unit in the sequence may optimize the data rate achievable by the sub-array of antenna elements coupled to that coupling unit.

The set of phase shifter modules for a coupling unit n in the sequence of coupling units may apply phase shift values $f_{RFn}^{opt}$ determined according to the equation $$f_{RFn}^{opt} = \underset{f_{RFn}}{\operatorname{argmax}} \ \log_2\left(1 + \frac{\rho}{\sigma^2 N_s} f_{RFn}^H G_n f_{RFn}\right),$$

where $\rho$ is the average received power at the receiver, $\sigma^2$ is the variance of the noise in the signal received at the receiver, $$G_n = H^H T_n^{-1} H, \ T_n = I_{N_{RF}} + \frac{\rho}{\sigma^2 N_{RF}} Q F_{RFn-1} F_{RFn-1}^H Q,$$

$I_{N_{RF}}$ an identity matrix, $F_{RFn-1}$ is a sub-matrix of a matrix of phase values $F_{RF}$ formed by removing the n'th column $f_{RFn}$ and Q is a matrix formed from a decomposition of a matrix $R = Q^H Q$, where $$R = \frac{1}{K} \sum_{k=1}^K \tilde{H}_r^H[k] \overline{H}_r[k]$$

and $\overline{H}_r[k]$ is a reduced-dimension beamspace channel after sub-arrays of antenna elements have been selected for each coupling unit and K is the number of sub-carriers over which signals are transmitted.

BRIEF DESCRIPTION OF DRAWINGS

The present disclosure will now be described by way of example with reference to the accompanying drawings. In the drawings.

DETAILED DESCRIPTION

To address the problems of performing full digital precoding within a mmWave MIMO system, the precoding can be split between digital precoding and analog precoding. Splitting the precoding across the digital and analog domains enables the digital precoder to be reduced in size. This reduction in size is realized by a reduced number of RF chains. The analog precoding is performed on the analog signals generated from the RF chains and is performed with the aim of increasing the gain of the antenna array through the performance of analog beamforming. In this way, the number of RF chains within the system can be reduced without suffering commensurate performance losses.

One way to implement the analog precoding is through an lens antenna array. A lens antenna array comprises a lens and an antenna array comprising a plurality of antenna elements in an array. The antenna elements may be located on the focal surface of the lens. The lens is an electromagnetic lens with a directional focusing ability (i.e. it operates to focus incident electromagnetic waves, or signals). The lens may therefore be said to function as a passive phase shifter that modifies an input signal phase according to its incident point on the lens' focal surface.

Figure 1:
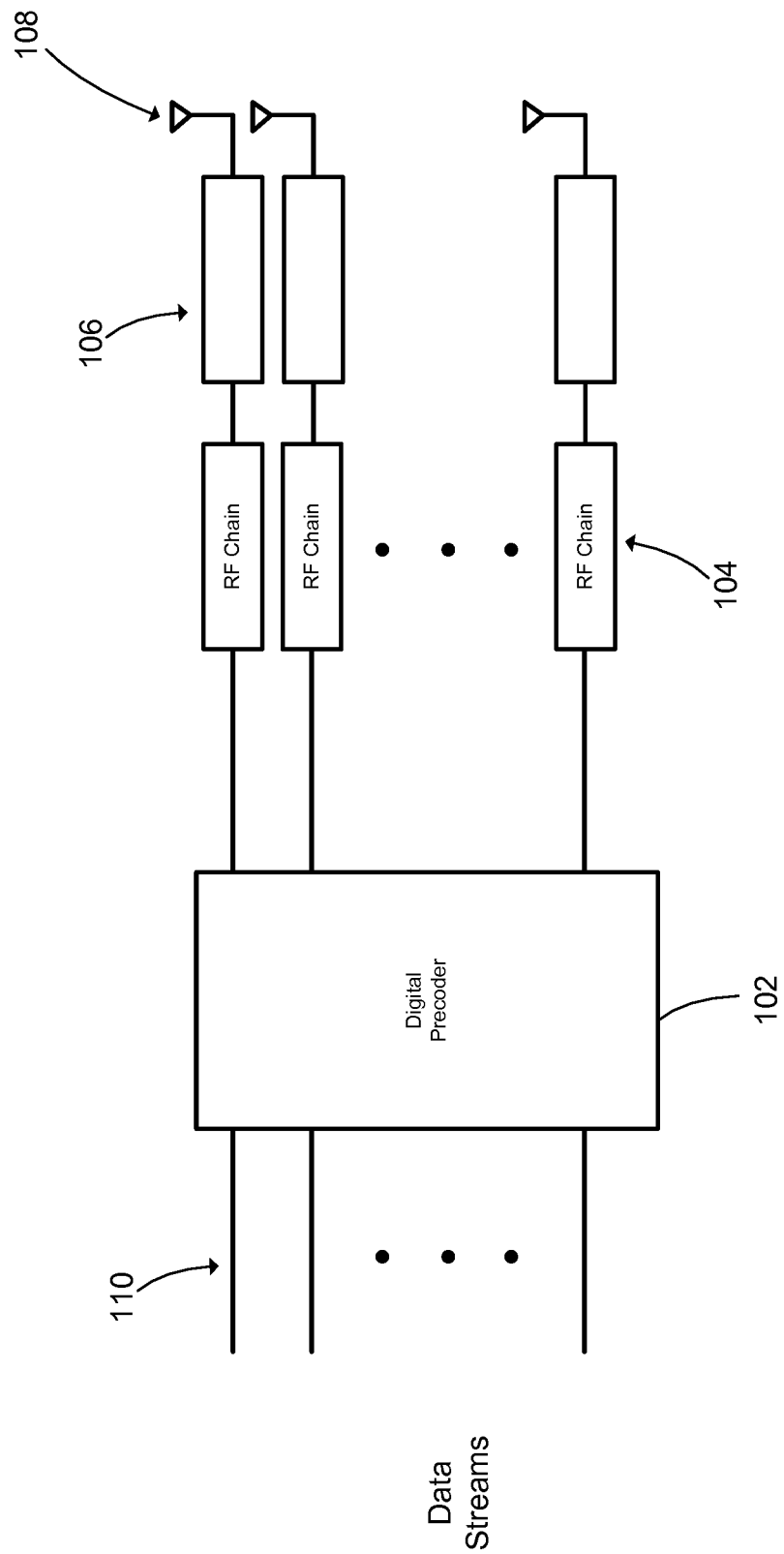
FIG. 1 shows an example of a fully digitally pre-coded MIMO transmitter.
Figure 2:
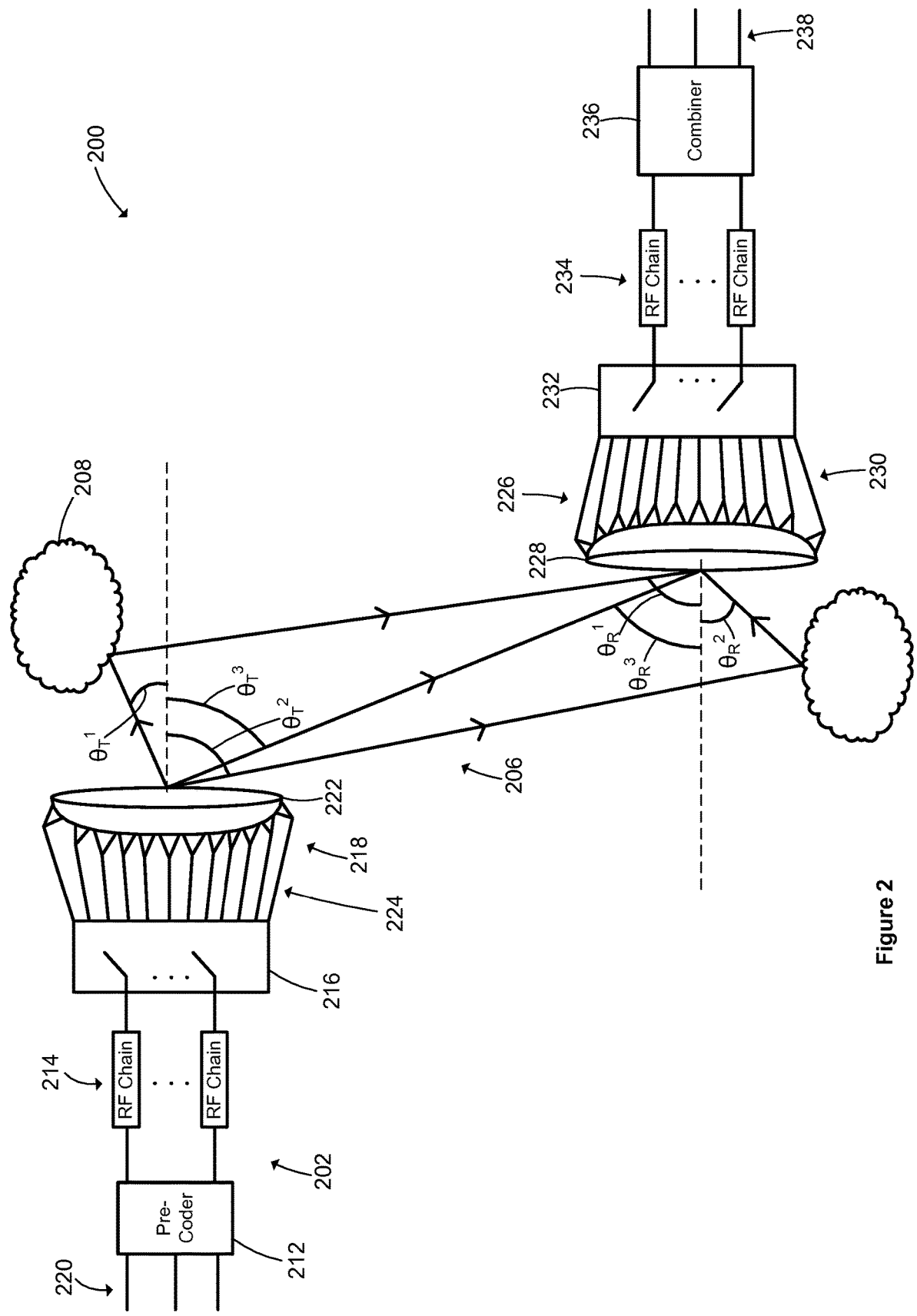
FIG. 2 shows an example of a MIMO system with lens antenna array.

FIG. 2 shows an example MIMO system implementing a lens antenna array.

The MIMO system is shown generally at 200. It comprises a MIMO transmitter 202 and a MIMO receiver 204. The transmitter 202 transmits wireless communication signals to the receiver 204 over communication channel 206. The channel 206 is a multi-path channel. The number of communication paths defined by the channel is denoted L. In this example, L=3 for illustration. L denotes the number of significant, or resolvable paths. A resolvable or significant path may be a path for which the signal power exceeds some threshold. Scattering objects 208 and 210 operate to scatter the signals received from the transmitter 202 that in part define the resolvable paths.

The MIMO system 200 is an orthogonal-frequency-division-multiplexing (OFDM) system (a MIMO-OFDM system). Thus, the transmitter 202 is configured to transmit wireless communication signals over K narrowband subchannels. A communication signal transmitted over the k'th subchannel may be referred to as the k'th subcarrier. The receiver is 204 is analogously configured to receive wireless communication signals over the K narrowband subchannels (i.e. the receiver is configured to receive K subcarriers). The frequency of the central subchannel is referred to as the carrier frequency, and is denoted $f_c$. The value of K may vary by implementation but could be, for example, 128.

The MIMO transmitter 202 comprises a digital precoder 212, a set of RF chains denoted generally at 214, a selecting unit 216 and a lens antenna array 218. The lens antenna array comprises an electromagnetic lens 222 and an antenna array 224 formed of a plurality of antenna elements. The antenna elements of the antenna array 224 are located on the focal surface of the lens 222. The number of antenna elements in the antenna array 224 is denoted $N_T$.

The digital precoder 212 receives a plurality $N_s$ of data streams 220 and performs digital precoding on those streams. The precoded streams are then passed through the RF chains 214, where each RF chain supports one data stream. The selecting unit 216 operates to connect each RF chain to one of the antenna elements of the lens antenna array 222. That is, each RF chain is connected to a switching element of the selecting unit 216. In other words, the selecting unit 216 selects an antenna element for each RF chain to transmit the signal generated by that RF chain. Put another way, each RF chain 214 is coupled to a single antenna element of the antenna array 218 by the selecting unit 216.

The MIMO receiver 204 contains analogous components to the transmitter. More specifically, it comprises a lens antenna array 226 comprising an electromagnetic lens 228 and an antenna array 230 formed of a plurality of antenna elements. The number of antenna elements in the array 230 is denoted $N_R$. The antenna array 230 is coupled to a selecting unit 232 that comprises a plurality of switching elements. Each switching element of the selecting unit 232 is coupled to a respective RF chain. The set of RF chains for the receiver 204 are denoted generally at 234. The set of RF chains are coupled to a digital combiner 236.

In operation, precoder 212 receives a plurality $N_s$ of data streams. The precoder performs digital precoding on those data streams. The precoding may include adjusting the weight and/or phase of each data stream. The precoding may be performed to reduce interference between different data streams. The precoded data streams are passed over the set of RF chains 214 to generate analog signal. A single data stream is passed through each RF chain; i.e. each RF chain supports a single data stream. The analog signal generated by an RF chain is indicative, or representative of, the data stream that passed through that RF chain. The selecting unit 216 is controlled to select a subset of antenna elements for communicating the signals generated by the RF chains. The selecting unit 216 selects for each RF chain an antenna element of the antenna array 218 to transmit the signal generated by that RF chain. In other words, the selecting unit 216 selectively couples each RF chain to a single antenna element of the antenna array 218. The antenna elements are selected so that the signals emitted from the lens 222 form a discrete number of beams. A beam refers to a collection of one or more signals focused in a particular direction or angle of travel. The antenna elements are selected so that a beam travels along each communication path. Thus, in this illustrated example, the selecting network 216 controls the switching elements to select antenna elements of the antenna array 218 so that the emitted signals form three beams: a first beam that travels over the first path, a second beam that travels over the second path and a third beam that travels over the third path.

Each beam has an angle of departure (AoD) from the lens 222. The angle of departure may be measured relative to a reference direction defined with respect to the lens. The angle of departure for the beam over the first path is denoted $\phi_T^1$, the angle of departure for the beam over the second path is denoted $\phi_T^2$ and the angle of departure for the beam over the third path is denoted $\phi_T^3$.

The emitted beams are communicated over the channel and received at the receiver 204. Each beam is incident on the lens 228 of the receiver 202 at an angle of arrival (AoA). The angle of arrival for each beam is measured relative to a reference direction defined with respect to the lens 228.

The lens 228 focuses the received beams onto a subset of antenna elements of the antenna array 230. Each of the subset of antenna elements (or selected ones of that subset) are coupled to a respective RF chain by the selecting unit 232. That is, the selecting unit 232 operates to couple selected antenna elements of the antenna array 230 to respective RF chains. The RF chains of the receiver 202 perform inverse operations to the RF chains of the transmitter. That is, whereas the RF chains 214 perform processing operations on received precoded data streams to generate analog signals, the RF chains 234 operate to generate a digital signal representative of a precoded data stream from a received analog signal. The digital signals generated by each RF chain are then communicated to the combiner 236. Combiner 236 operates to undue, or remove, the precoding applied to the data streams by the precoder 212 of the transmitter to generate decoded data streams 238.

The use of the lens antenna arrays 218 and 226 enables the number of RF chains in the transmitter 202 and receiver 204 to be reduced without commensurate performance losses compared to fully digitally precoded MIMO systems. This will now be explained in more detail.

The spatial channel H[k] between the transmitter 202 and receiver 204 for sub-channel k can be modelled as:

$$H[k] = \sqrt{\frac{N_T N_R}{L}} \sum_{l=1}^{L} \beta_l a_R(\phi_R^l(f_k)) a_T^H(\phi_T^l(f_k)) e^{-j2\pi \tau_l f_k} \quad (1)$$

In equation (1), L is the number of resolvable paths (which in this example is three), $\beta_l$ and $\tau_l$ are the complex gain and time delay of the l'th path, $$(\phi_R^l(f_k)) = \left(\frac{df_k}{c}\right)\sin\theta_R^l$$

and $$(\phi_T^l(f_k)) = \left(\frac{df_k}{c}\right)\sin\theta_T^l$$

are the spatial AoA and AoD respectively at subchannel k, d is the antenna element spacing, c is the speed of light in meters per second, $\theta_R^l$ and $\theta_T^l$ are the physical AoA and AoD for path l and $f_k$ is the frequency of sub-channel k.

The value $f_k$ is given by:

$$f_k = f_c + \frac{f_s}{K}\left(k - 1 - \frac{K-1}{2}\right) \quad (2)$$

where $f_s$ is the bandwidth of each sub-channel and K is the total number of sub-channels.

The value of the carrier frequency $f_c$ may be given by:

$$f_c = \frac{c}{2d} \quad (3)$$

The values $a_T$ and $a_R$ are the array response vectors at the transmitter and receiver respectively. The vector $a_T$ is of size $N_T \times 1$ (i.e. it is an $N_T$ element vector) and the vector $a_R$ is of size $N_R \times 1$ (i.e. it is an $N_R$ element vector).

The lens antenna arrays 218, 226 enable the spatial channel H[k] to be transformed to a beamspace channel. Each of the lens antenna arrays 218 and 226 can be mathematically modelled as a discrete Fourier transform (DFT) matrix, denoted $U_T$ and $U_R$ respectively. The matrix $U_T$ is of size $N_T \times N_T$, whose $N_T$ columns correspond to orthogonal beamforming vectors of $N_T$ pre-defined directions (i.e. $N_T$ beams) that cover the angular space of the lens antenna array 218. The matrix $U_R$ is of size $N_R \times N_R$, whose $N_R$ columns correspond to orthogonal beamforming vectors of $N_R$ pre-defined directions (i.e. $N_R$ beams) that cover the angular space of the lens antenna array 226.

The matrix $U_T$ can be expressed as:

$$U_T = [a_T(\bar{\phi}_T^1), a_T(\bar{\phi}_T^2), \ldots, a_T(\bar{\phi}_T^{N_T})] \quad (4)$$

And the matrix $U_R$ can be expressed as:

$$U_R = [a_R(\bar{\phi}_R^1), a_R(\bar{\phi}_R^2), \ldots, a_R(\bar{\phi}_R^{N_R}),] \quad (5)$$

where:

$$\bar{\phi}_T^n = \frac{1}{N_T}\left(n - \frac{N_T + 1}{2}\right) \text{ for } n = 1, 2 \ldots N_T \quad (6)$$

$$\bar{\phi}_R^n = \frac{1}{N_R}\left(n - \frac{N_R + 1}{2}\right) \text{ for } n = 1, 2 \ldots N_R \quad (7)$$

The beamspace channel, denoted $\tilde{H}[k]$, is then expressed as:

$$\tilde{H}[k] = U_R^H H[k] U_T \quad (8)$$

It is observed that $a_{T,R}^H(\phi_1)a_{T,R}^H(\phi_2) \approx 1$ when $\phi_1 \approx \phi_2$ and $a_{T,R}^H(\phi_1)a_{T,R}^H(\phi_2) \approx 0$ when $\phi_1 \neq \phi_2$. Thus, when the values of $N_T$ and $N_R$ are relatively large (e.g., 64) the beamspace channel $\tilde{H}[k]$ for sub-channel k is a sparse matrix. This sparsity reflects the limited scattering typically experienced by mmWave signals. The sparsity of the channel matrix means that the signal power over the channel is focused on beams with AoAs and AoDs equal to or close to $\phi_R^l(f_k)$ and $\phi_T^l(f_k)$ for l=1, 2, . . . L. These beams may be referred to as power-focused, or dominant, beams. The selecting unit (e.g. unit 216 and 232) can therefore be used to select only the antenna elements of the array that transmit/receive these dominant beams. This may be referred to as beam selection, or antenna selection. By selecting only the subset of antenna elements that emit/receive the dominant beams, the number of RF chains in the transmitter and receiver can be reduced. This is referred to as reducing the MIMO dimension.

Figure 3:
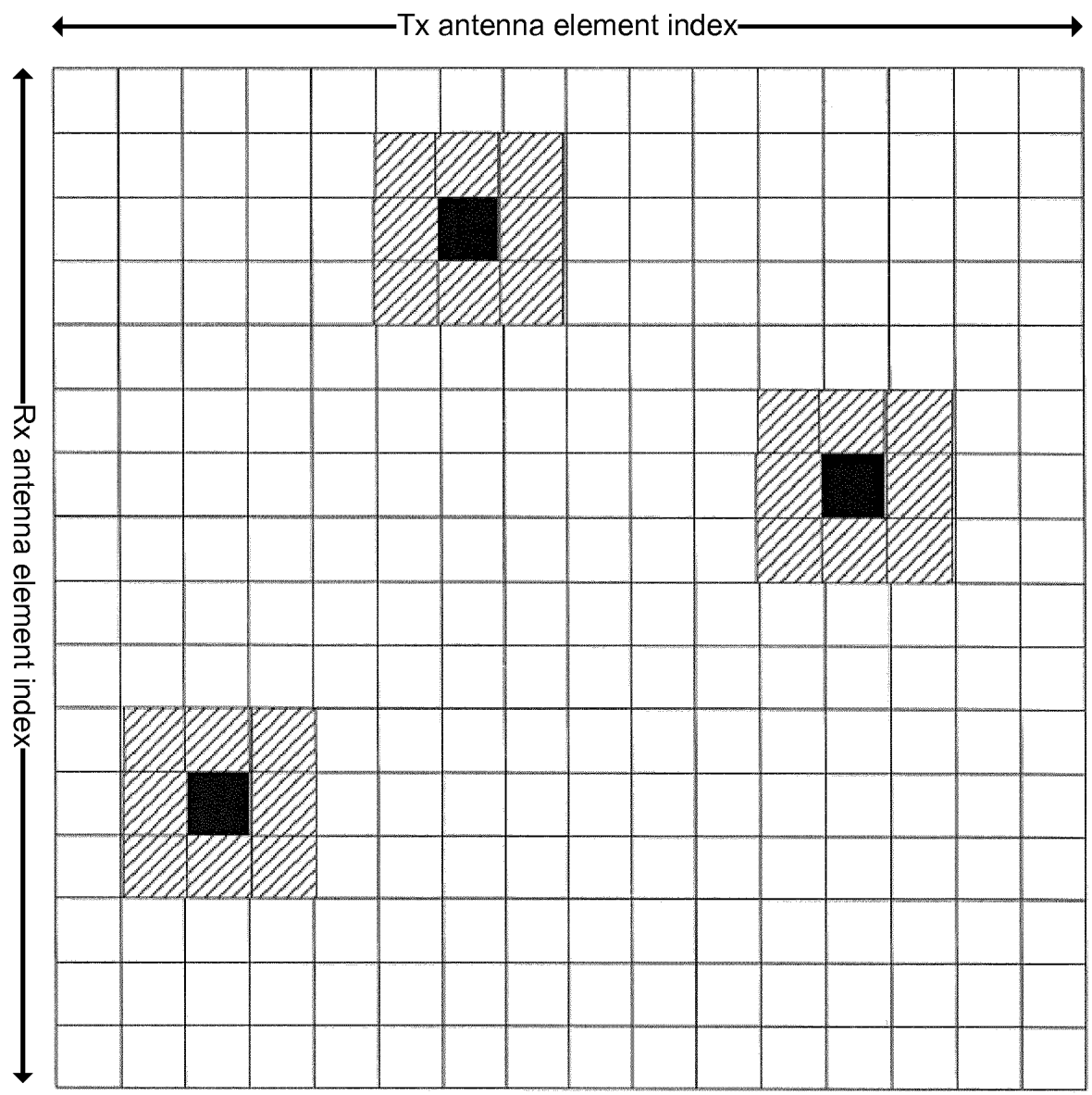
FIG. 3 shows a schematic illustration of a beamspace channel.

FIG. 3 is a schematic illustration of the sparsity of the beamspace channel for the L=3 path environment illustrated in FIG. 2. The solid blocks indicate the antenna element pair (i,j) that transmit/receive the most dominant beam for each path l, i.e. the antenna element i of the transmitter and the antenna element j of the receiver. The hatched blocks around each solid block indicate the antenna element pairs that transmit/receive non-negligible beams for each path l. Thus, a beamspace channel in accordance with the example shown in FIG. 3 would require only 9 of the $N_T$ transmitter antenna elements and 9 of the $N_R$ receiver antenna elements to transmit a significant proportion of the full channel power. It can therefore be appreciated from this example how the sparsity of the beamspace channel enables the MIMO dimensionality to be reduced without significantly impacting the performance of the MIMO system.

Though the MIMO system 200 can offer advantages of reduced power consumption and hardware costs compared to fully digitally precoded MIMO systems, it can suffer drawbacks when implemented as a wideband system.

For narrowband systems, $f_c \approx f_k$. Thus, the spatial AoA $\phi_R^l(k)$ and the spatial AoD $\phi_T^l(k)$ are approximately constant and frequency independent. This in turn means the power-focused beams to be selected by selecting units 216, 232 are frequency independent.

However, for wideband systems, $f_c \neq f_k$ and thus the spatial AoA $\phi_R^l(k)$ and the spatial AoD $\phi_T^l(k)$ are frequency-dependent. This means that the power-focused beams are different for different sub-channels k. Thus, in order to avoid compromising the performance over parts of the channel bandwidth, more beams (and hence antenna elements) need to be selected by selecting units 216, 232 compared to the narrowband case. However, selecting more beams/antenna elements required more RF chains, leading to the aforementioned problems of higher hardware costs and power consumption.

Aspects of the present disclosure are directed to MIMO systems that can be implemented within a wideband channel and maintain adequate performance levels across the whole channel bandwidth without increasing the number of RF chains compared to the architecture illustrated in FIG. 2.

Figure 4:
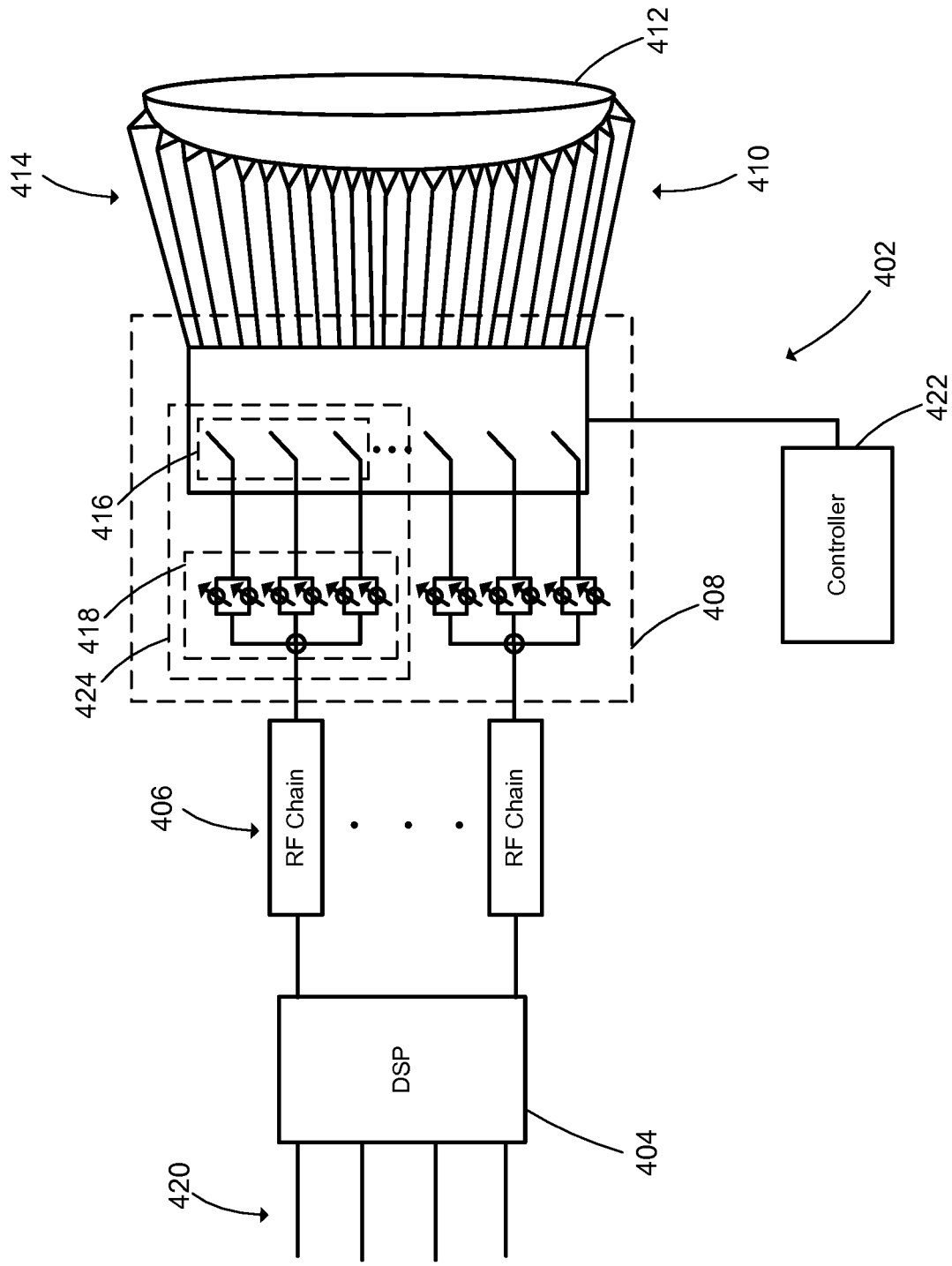
FIG. 4 shows a MIMO transmitter with lens antenna array in accordance with the present disclosure.

FIG. 4 shows an example MIMO transmitter 402 in accordance with an embodiment of the present disclosure. The transmitter 402 comprises a digital signal processor (DSP) 404, a plurality of RF chains (denoted generally at 406), a selecting unit 408 and a lens antenna array 410. Transmitter 402 is an OFDM-MIMO transmitter. It can therefore transmit wireless communication signals over K sub-channels as described above with reference to FIG. 2.

The DSP 404 is configured to receive a plurality of data streams 420. The number of data streams received by the DSP 404 is denoted $N_s$. The DSP 404 performs digital precoding on the data streams. The DSP 404 may for example process the data streams to reduce or cancel interference between different data streams. The DSP 404 may also adjust the amplitude and/or phase of the input data streams. Thus, an example of the DSP is a digital precoder.

The set of RF chains 406 are coupled to the DSP 404. Though only two RF chains are illustrated in FIG. 4, it will be appreciated that this merely for clarity and any suitable number of RF chains may be included within the transmitter. The number of RF chains is denoted $N_{RF}^T$. Each RF chain is configured to pass a precoded data stream from the DSP 404 to generate a signal representing, or indicative of, that data stream. The generated signal may be an analog signal. Each RF chain may support, or pass, a single data stream.

Each RF chain may include transceiver circuitry and operate as described above with reference to RF chains 214.

Lens antenna array 410 operates in an analogous way to lens antenna array 218 described above with reference to FIG. 2. The lens antenna array 410 comprises electromagnetic lens 412 and an antenna array 414 formed of a set of antenna elements. The number of antenna elements in array 414 is again denoted $N_T$. The antenna elements may be located on the focal surface of the lens. The lens antenna array operates to focus signals transmitted by the antenna elements into a discrete number of beams that are transmitted over the communication channel.

Coupled between the $N_{RF}^T$ RF chains and the lens antenna array 410 is the selecting unit 408. The selecting unit 408 receives as its inputs the output of the RF chains 406, and outputs signals to antenna elements of the antenna array 414. The selecting unit 408 comprises, for each RF chain, a set of switching elements for coupling that RF chain to a sub-array of antenna elements concurrently. Each sub-array contains a plurality (i.e. more than one) of antenna elements. That is, each set of switching elements of the selecting unit is associated with a respective RF chain; i.e. each RF chain is associated with its own unique set of switching elements. Put another way, each set of switching elements corresponds to a respective RF chain. Each set of switching elements may be unique in the sense that no switching element in the selecting unit 408 belongs to more than one set of set, i.e. each switching element in a set belongs only to that set.

An example set of switching elements is shown at 416. Each switching element in a set of switching elements for an RF chain couples that RF chain to a respective antenna element. Thus, the number of antenna elements that can be concurrently coupled to a given RF chain is limited to the number of switching elements in the set of switching elements associated with that RF chain. The number of antenna elements that can be coupled to each RF chain concurrently is denoted $N_T^{B_{RF}}$. Thus, there are $N_T^{B_{RF}}$ switching elements in a set of switching elements. In the example shown in FIG. 4, $N_T^{B_{RF}}=3$. In general, $N_T^{B_{RF}}$ is less than $N_T$, i.e. each RF chain is limited to being concurrently connected to a sub-array of antenna elements less than the total number of elements in the antenna array. The total number of antenna elements that can be concurrently selected by the selecting unit 408, denoted NF, is therefore given by the $N_T^B = N_T^{B_{RF}} \cdot N_{RF}^T$.

As there are a respective set of switching elements 416 for each RF chain, the number of sets of switching elements in the selecting unit 408 might be equal to the number of RF chains, $N_{RF}^T$.

The selecting unit 408 further comprises, for each RF chain, a corresponding set of phase shifter modules. A set of phase shifter modules is shown at 418. Each set of phase shifter modules is therefore associated with, or corresponds to, a respective RF chain. Each set of phase shifter modules is unique, i.e. no phase shifter module belongs to more than one set of phase shifter modules, or equivalently each phase shifter module in a set belongs only to that set. Each RF chain may therefore be said to be coupled to a corresponding set of phase shifter modules and corresponding set of switching elements.

Each phase shifter module is coupled between an RF chain and a respective switching element. Each phase shifter module of a set associated with an RF chain couples that RF chain to a respective switching element of the set of switching elements also associated with that RF chain. Thus, for each RF chain the number of phase shifter modules in each set of phase shifter modules is equal to the number of switching elements in the set of switching elements associated with that RF chain. The number of phase shifter modules that are included within each set of phase shifter modules may therefore be given by $N_T^{B_{RF}}$.

In the example shown here, each phase shifter module comprises two phase shifters. The two phase shifters are arranged in parallel and operate to adjust the amplitude and/or phase of the signal generated from the corresponding RF chain. Each phase shifter module may therefore be referred to as a two-phase shifter module. It is noted that each phase shifter module in a set associate with an RF chain can process the signal from that RF chain independently of the other phase shifter modules in that set.

Put another way, the selecting unit 408 may be said to comprise a plurality of coupling units. Each coupling unit operates to couple a respective RF chain to a sub-array of antenna elements concurrently. Thus, each coupling unit is connected to a respective RF chain. Each coupling unit may therefore be said to correspond to a respective RF chain. Each sub-array of antenna elements contains only a subset of the antenna elements of the antenna array 414 (i.e., the number of antenna elements in each sub-array is less than the total number of antenna elements $N_T$). Thus, each coupling unit operates to concurrently select a sub-array of antenna elements to be coupled to its corresponding RF chain for transmitting the signal that is passed through that RF chain. Because the lens 412 operates to focus the signals emitted from the antenna elements into a discrete number of beams, each coupling unit may equivalently be said to select a set of beams to be emitted from the lens antenna array 414. Each beam selected by a coupling unit communicates the signal passed through the RF chain coupled to that coupling unit. The number of antenna elements (and equivalently, beams) that can be concurrently selected by each coupling unit is $N_T^{B_{RF}}$.

An example coupling unit is shown at 424. Each coupling unit comprises a set of phase shifter modules 418 and a set of switching elements 416, as described above. The set of switching elements for each coupling unit are used to select the set of beams to be transmitted for the corresponding RF chain. That is, the set of switching elements are used to select the sub-array of antenna elements to be coupled to that RF chain. The set of phase-shifter modules are used to control the amplitude and/or phase of the signal passed through the RF chain. In this way, each coupling unit can operate to concurrently select a set of beams to be transmitted from the lens antenna array 410 by the respective RF chain coupled to that coupling unit and to control the amplitude and/or phase of those selected beams.

Figure 5:
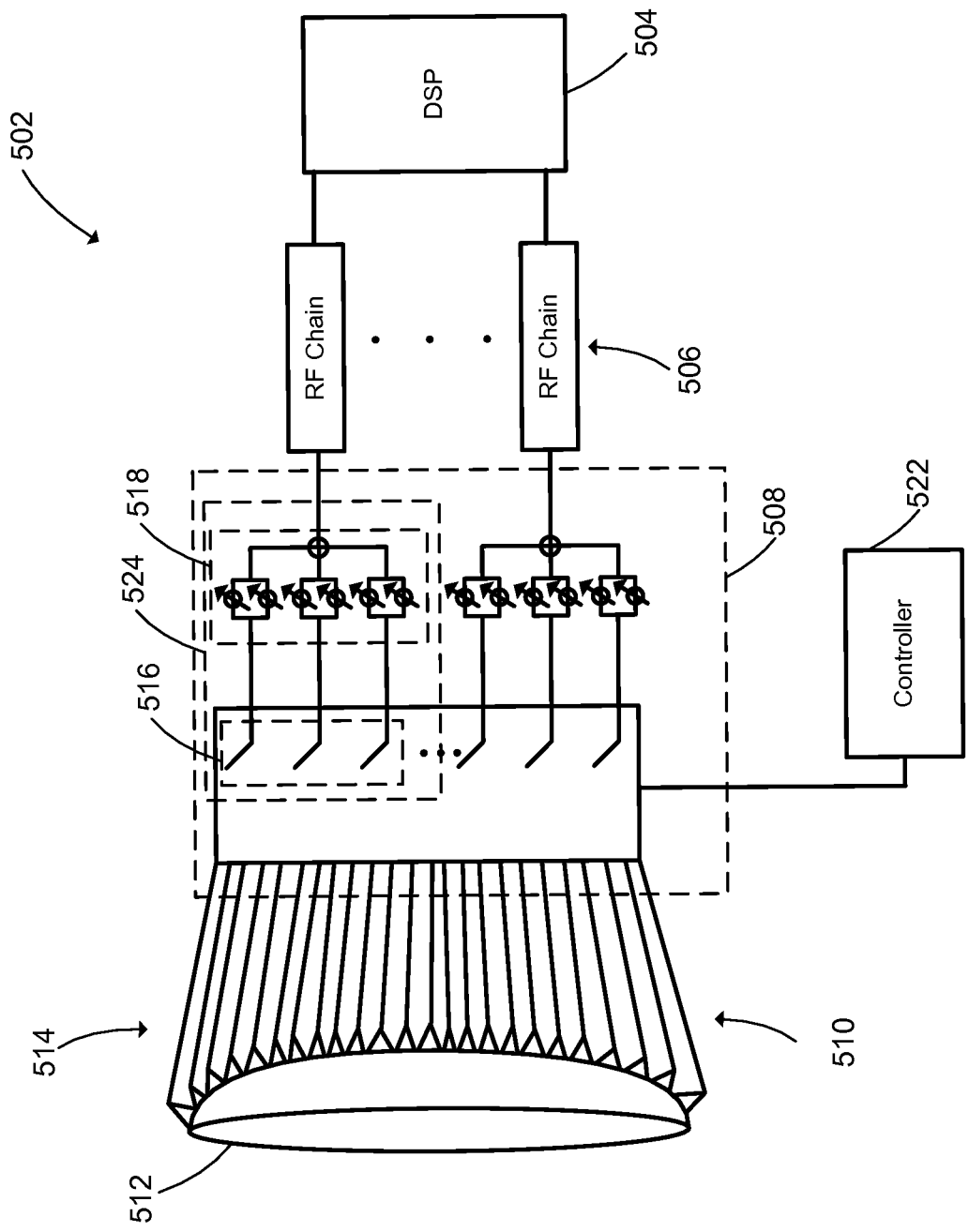
FIG. 5 shows a MIMO receiver with lens antenna array in accordance with the present disclosure.

FIG. 5 shows the corresponding MIMO receiver according to an embodiment of the present disclosure.

The receiver 502 comprises a digital signal processor (DSP) 504, a plurality of RF chains (denoted generally at 506), a selecting network 508 and a lens antenna array 510. Receiver 402 is an OFDM-MIMO transmitter. It can therefore receive wireless communication signals over K sub-channels as described above with reference to FIG. 2.

The DSP 504 and RF chains 506 operate in an analogous way to pre-coder 236 and RF chains 234 described above with reference to FIG. 2, and so a description of these components will not be repeated here. The number of RF chains in the set 506 is denoted $N_{RF}^R$. The number of RF chains in receiver 502 is not necessarily equal to the number of RF chains in the transmitter 402, though in some implementations it might be, depending on the nature of the beamspace channel.

Lens antenna array 510 operates in an analogous way to lens antenna array 226 described above with reference to FIG. 2. The lens antenna array 510 comprises electromagnetic lens 512 and an antenna array 514 formed of a set of antenna elements. The number of antenna elements in array 514 is again denoted $N_R$. The antenna elements may be located on the focal surface of the lens 512.

The selecting unit 508 is coupled between the lens antenna array 510 and the $N_{RF}^R$ RF chains. The selecting unit 508 has an analogous architecture to the selecting unit 408 described above.

The selecting unit 508 receives signals from the antenna elements of the array 414 and outputs signals to the RF chains 506. The selecting unit 508 comprises, for each RF chain, a set of switching elements for coupling that RF chain to a sub-array of antenna elements concurrently. That is, each set of switching elements of the selecting unit 508 is associated with a respective RF chain; i.e. each RF chain is associated with its own unique set of switching elements. Put another way, each set of switching elements corresponds to a respective RF chain. Each set of switching elements may be unique in the sense that no switching element in the selecting unit 408 belongs to more than one set of set, i.e. each switching element in a set belongs only to that set.

An example set of switching elements is shown at 516. Each switching element in a set of switching elements for an RF chain couples that RF chain to a respective antenna element. Thus, the number of antenna elements that can be concurrently coupled to a given RF chain is limited to the number of switching elements in the set of switching elements associated with that RF chain. The number of antenna elements that can be coupled to each RF chain concurrently is denoted $N_R^{B_{RF}}$. Thus, there are $N_R^{B_{RF}}$ switching elements in a set of switching elements. In the example shown in FIG. 4, $N_R^{B_{RF}}=3$. In general, $N_R^{B_{RF}}$ is less than $N_R$, i.e. the number of antenna elements in each sub-array is less than the total number of elements in the antenna array. The total number of antenna elements that can be concurrently selected by the selecting unit 508, denoted $N_R^B$, is therefore given by $N_R^B = N_R^{B_{RF}} \cdot N_{RF}^R$.

The number of sets of switching elements in the selecting unit 508 might be equal to $N_{RF}^R$.

The selecting unit 508 further comprises, for each RF chain, a corresponding set of phase shifter modules. A set of phase shifter modules is shown at 518. The sets of phase shifter modules and their relationship to the corresponding sets of switching elements are analogous to the sets of phase shifter modules described above with reference to FIG. 4. Thus, the number of phase shifter modules that are included within each set of phase shifter modules 518 may therefore be given by $N_R^{B_{RF}}$.

In operation, each set of switching elements (e.g. set 516) concurrently selects beams received at the selected antenna elements. Each selected beam is then passed through a respective phase shifter module of the associated set of phase shifter modules (e.g. set 518) to generate a phase and/or amplitude adjusted signal. The phase and/or amplitude adjusted signals are then combined, with the resultant combined signal being passed over the associated RF chain.

Selecting unit 508 may also be said to comprise a plurality of coupling units. Each sub-coupling unit operates to couple a respective RF chain to a sub-array of antenna elements concurrently. Thus, each coupling unit is connected to a respective RF chain. Each sub-array of antenna elements contains only a subset of the antenna elements of the antenna array 514 (i.e., the number of antenna elements in each sub-array is less than the total number of antenna elements $N_R$). Thus, each coupling unit operates to concurrently select a sub-array of antenna elements to be coupled to its corresponding RF chain for receiving the beams received at those antenna elements. In other words, each coupling unit operates to select a set of beams to be received by its corresponding RF chain coupled to that coupling unit.

The number of received beams that can be concurrently selected by each coupling unit is $N_R^{B_{RF}}$. An example coupling unit is shown at 524. Each coupling unit comprises a set of phase shifter modules (e.g. 518) and a set of switching elements (e.g. 516). The set of switching elements for each coupling unit are used to select the set of beams to be received for the corresponding RF chain. That is, the set of switching elements are used to select the sub-array of antenna elements to be coupled to that RF chain for receiving the beams received at the antenna elements of that sub-array. The set of phase-shifter modules are used to control the amplitude and/or phase of each selected beam. In this way, each coupling unit can operate to concurrently select a set of beams to be received from the lens antenna array 410 by the respective RF chain coupled to that coupling unit and to control the amplitude and/or phase of those selected beams before those beams are combined and passed to the RF chain.

The architecture of the transmitter 402 and receiver 502 can provide several advantages over the MIMO transmitter/receiver with lens antenna array shown in FIG. 2. Firstly, by having a set of switching elements associated with each RF chain, a single RF chain can be connected to multiple antenna elements of the antenna array 414/514 concurrently. This is not possible with the system shown in FIG. 2, where each RF chain can only be connected to a single antenna element at any given time. This in turn enables the coupling unit 408/508 to select multiple beams concurrently by a single RF chain. Thus, the coupling unit 408/508 can select multiple power-focused beams by a single RF chain, enabling better capture of the channel signal power over the whole bandwidth of the channel without increasing the number of RF chains in the transmitter/receiver. Secondly, the set of phase shifter modules can adjust the amplitude and/or gain of each selected beam, which can lead to further improvements in array gains compared to the system shown in FIG. 2. In other words, the transmitter 402 and the receiver 502 each provide a greater level of analog precoding than the transmitter 202 and receiver 204 shown in FIG. 2.

An approach to selecting the optimal beams for transmitting and receiving using the selecting units to capture high levels of signal power over the channel will now be described.

The point-to-point relationship between a transmit signal vector s[k] transmitted by transmitter 402 and a receive signal vector y[k] received at the receiver 502 for sub-channel k can be modelled mathematically as:

$$Y[k] = w_{BB}^H[k] w_{RF}^H S_R^H \tilde{H}(k) S_T F_{RF} F_{BB}[k] s[k] + w_{BB}^H[k] w_{RF}^H S_R^H n[k] \quad (9)$$

where:
  $\tilde{H}(k)$ is the beamspace channel defined by equation (8) above;
  $S_T$ and $S_R$ are the transmission and receiver antenna/beam selectors realized by the switching elements of selecting units 408 and 508 respectively;
  $F_{RF}$ and $W_{RF}$ are the transmitter and receiver analog beamformers (the analog precoders and combiners) realized by the phase shifter modules of the selecting units 408 and 508 respectively;

$F_{BB}$ is the transmitter digital precoder realized by DSP 404 and $W_{BB}$ is the receiver digital combiner realized by DSP 504; and n[k] is the noise vector.

It is noted that $S_T$, $S_R$ and $F_{RF}$, $W_{RF}$ are frequency independent (i.e. independent of k) because they are realized by analog circuits. However, $F_{BB}$ and $W_{BB}$ are frequency-dependent because they are realized by digital precoders/combiners respectively in the baseband. It is also noted that $F_{BB}$ and $F_{RF}$ satisfy the power constraint $\|F_{BB}F_{RF}[k]\|^2=N_s$, where it will be recalled that $N_s$ is the number of data streams.

It has been found that decoupling the design of $S_T$ and $S_R$ (i.e., determining the selection of beams to transmit independently of the determination of the beams to receive) enables beams to be selected that maximize the power preservation of the wideband channel given the constraints placed by the number of RF chains. The beam selection process can then be separated into two distinct steps.

In the first step, the design of $S_T$ is determined (i.e. the $N_T^B$ antenna elements of array 414 to be selected by selecting unit 408 are determined). A design of $S_T$ is determined so that the sub-array of antenna elements selected by the set of switching elements 418 in each coupling unit can be determined. In this step, it is assumed that $S_R=I$. The optimal value of $S_T$, denoted $S_T^*$, is given by:

$$S_T^* = \underset{S_T}{\operatorname{argmax}}\ tr\left(S_T^H\left(\frac{1}{K}\sum_{k=1}^K \tilde{H}^H[k]\tilde{H}[k]\right)S_T\right) \quad (10)$$

The n'th diagonal element of $\Sigma_{k=1}^K \tilde{H}^H[k]\tilde{H}[k]$ represents the power of the n'th transmitted beam. Thus, if the selecting unit 408 is going to select a total of $N_T^B$ beams to transmit, $S_T$ should be designed to select the $N_T^B$ largest diagonal elements of $\Sigma_{k=1}^K \tilde{H}^H[k]\tilde{H}^H[k]$. This identifies the $N_T^B$ antenna elements of array 414 to be selected by the coupling units of the transmitter. Thus, the value of $S_T$ indicates the sub-array of antenna elements of the antenna array 414 to be selected for, i.e. coupled to, each RF chain. Equivalently, the value of $S_T$ for each RF chain indicates which beams are to be transmitted from the lens antenna array 410 for each RF chain.

In the second step, the design of $S_R$ is determined in dependence on the determined design of $S_T$. A design of $S_R$ is determined so that the sub-array of antenna elements selected by each set of switching elements 518 can be determined. In other words, a design of $S_R$ is determined to identify the $N_R^B$ antenna elements of array 514 to be selected by the selectin unit 508. The optimal value of $S_R$, denoted $S_R^*$, is given by:

$$S_R^* = \underset{S_R}{\operatorname{argmax}}\ tr\left(S_R^H\left(\frac{1}{K}\sum_{k=1}^K \tilde{H}[k]S_T^*S_T^{*H}\tilde{H}^H[k]\right)S_R\right) \quad (11)$$

The n'th diagonal element of $\Sigma_{k=1}^K \tilde{H}[k]S_T^*S_T^{*H}\tilde{H}^H[k]$ represents the power of the n'th received beam. Thus, if the selecting unit 508 is going to select $N_R^B$ beams to receive, $S_R$ should be designed to select the $N_R^B$ largest diagonal elements of $\Sigma_{k=1}^K \tilde{H}[k]S_T^*S_T^{*H}\tilde{H}^H[k]$ This identifies the $N_R^B$ antenna elements of array 514 to be selected by the coupling units of the receiver. Thus, the value of $S_R$ indicates which sub-array of antenna elements of the antenna array 514 are to be selected for, i.e. coupled to, each RF chain.

Equivalently, the value of $S_R$ indicates which beams are to be received from the lens antenna array 510 for each RF chain.

It will be appreciated that increasing the values of $N_T^B$ and $N_R^B$ enables more signal power over the channel to be captured by selecting more beams to be transmitted and received and, in general, setting $N_T^B=N_T$ and $N_R^B=N_R$ enables all the signal power to be captured. However, increasing the values of $N_T^B$ and $N_R^B$ also increases the number of phase shifter modules, leading to increased hardware cost and power consumption. It has been found that a good trade-off between hardware cost and power consumption on the one hand and performance on the other can be achieved by setting the values of $N_T^B$ and $N_R^B$ as follows:

$$N_T^B = N_{RF}^T \cdot N_T^{BRF} = N_{RF}^T\left\lceil\frac{N_TB}{2f_c}\right\rceil \quad (12)$$

$$N_R^B = N_{RF}^R \cdot N_R^{BRF} = N_{RF}^R\left\lceil\frac{N_RB}{2f_c}\right\rceil \quad (13)$$

In (12) and (13), B is the bandwidth of the channel.

Figure 6:
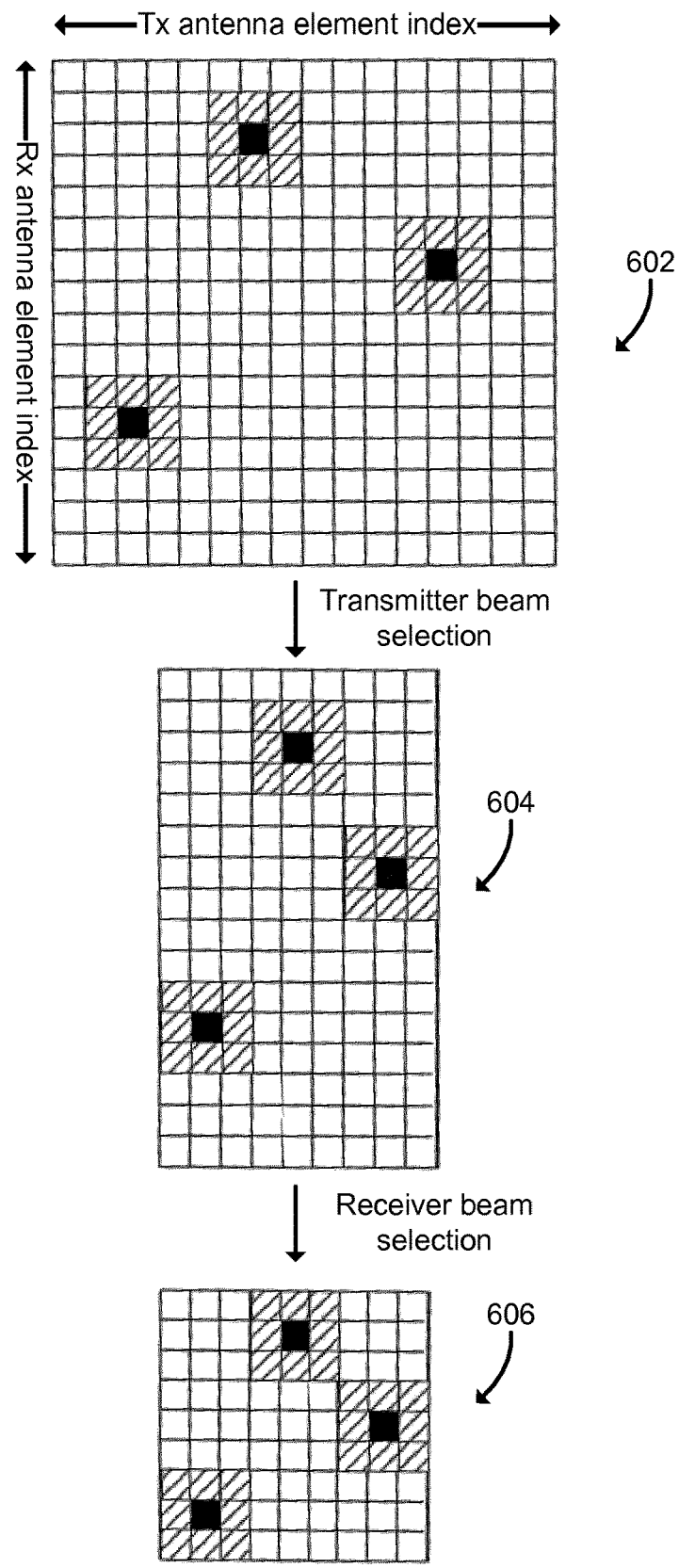
FIG. 6 shows an illustration of the antenna, or beam, selection process to reduce the dimensionality of the beamspace channel.

FIG. 6 shows a schematic illustration of the two-step beam selection process. The illustration of the beamspace channel shown in FIG. 3 is repeated at 602. The reduced dimensional channel following the transmitter beam selection is shown at 604. It can be seen that the channel is unaltered in the receiver direction. The further reduced dimensional channel following the second step of receiver beam selection is shown at 606.

The beam-selection process for the transmitter may be performed by a controller 422, and the beam-selection process for the receiver may be performed by a controller 522. Controllers 422, 522 are coupled to the switching elements of selecting units 408 and 508 respectively and operate to control those switching elements in dependence on the beams to be selected determined from the beam selection process.

An approach to optimize the beamspace precoding will now be described. It will be recalled that in the transmitter 402, precoding is divided between digital precoding (performed by DSP 404) and analog precoding (performed by the selecting unit 408). An approach to determining parameters for the digital and analog precoding will be set out below. The parameters will be determined to optimally reduce interference between different data streams.

The total achievable bit rate for sub-channel k, $\tilde{R}[k]$, can be modelled as:

$$\underset{F_{RF}F_{BB}[k]}{\max}\frac{1}{K}\sum_{k=1}^K \tilde{R}[k] = \underset{F_{RF}F_{BB}[k]}{\max} \quad (14)$$

$$\frac{1}{K}\sum_{k=1}^K \log_2\left|I_{N_s} + \frac{\rho}{\sigma^2 N_s}\overline{H_r}[k]F_{RF}F_{BB}[k]F_{BB}^H[k]F_{RF}^H[k]\tilde{H}_r^H[k]\right|$$

where:

$\tilde{H}_r[k]=S_R^H\tilde{H}(k)S_T$ is the dimension-reduced beamspace channel after the beam selection process;

$\rho$ is the average received power at the receiver;

$\sigma^2$ is the variance of the signal noise assumed to have a Gaussian distribution.

It can be seen from (14) that the optimal digital precoder can be modelled as:

$$F_{BB}[k] = V_{eff}[k] P_{eff}^{\frac{1}{2}}[k] \quad (15)$$

where $V_{eff}[k]$ is the right singular matrix of the effective channel matrix $$\widetilde{\mathbf{H}}_r[k] F_{RF} \left( F_{RF}^H \tilde{H}_r^H \right)^{\frac{1}{2}} = \widetilde{\mathbf{H}}_r[k] F_{RF}, \text{ and } P_{eff}^{\frac{1}{2}}[k]$$

is a diagonal matrix of the allocated power to data streams according to the water filling solution. For regions of high signal to noise ratio, $$P_{eff}^{\frac{1}{2}}[k] \approx I,$$

which gives:

$$\frac{1}{K}\sum_{k=1}^{K} \tilde{R}[k] \approx \sum_{k=1}^{K} \log_2 \left| I_{N_S} + \frac{\rho}{\sigma^2 N_s} F_{RF}^H \tilde{H}_r^H[k] \widetilde{\mathbf{H}}_r[k] F_{RF} \right| \leq \quad (16)$$

$$\log_2 \left| I_{N_S} + \frac{\rho}{\sigma^2 N_s} F_{RF}^H \left( \frac{1}{K}\sum_{k=1}^{K} \tilde{H}_r^H[k] \tilde{H}_r[k] \right) F_{RF} \right|$$

Defining $$R = \frac{1}{K}\sum_{k=1}^{K} \tilde{H}_r^H[k] \widetilde{\mathbf{H}}_r[k],$$

the optimisation target is given by:

$$\log_2 \left| I_{N_S} + \frac{\rho}{\sigma^2 N_s} F_{RF}^H R F_{RF} \right| \quad (17)$$

R is a Hermitian positive definite matrix, and thus can be decomposed as: $R = Q^H Q$, meaning (17) can be re-written as:

$$\log_2 \left| I_{N_S} + \frac{\rho}{\sigma^2 N_s} Q F_{RF} F_{RF}^H Q^H \right| \quad (18)$$

$$= \log_2 \left| I_{N_S} + \frac{\rho}{\sigma^2 N_s} Q F_{RF_{N_s-1}} F_{RF_{N_s-1}}^H Q^H + \frac{\rho}{\sigma^2 N_s} Q f_{RF_{N_s}} f_{RF_{N_s}}^H Q^H \right| \quad (19)$$

$$= \log_2 |T_{N_s}| + \log_2 \left| 1 + \frac{\rho}{\sigma^2 N_s} f_{RF_{N_s}}^H Q^H T_{N_s}^{-1} Q f_{RF_{N_s}} \right| \quad (20)$$

where:

$$T_{N_s} = I_{N_S} + \frac{\rho}{\sigma^2 N_s} Q F_{RF_{N_s-1}} F_{RF_{N_s-1}}^H Q$$

$f_{RF_{N_s}}$ is the $N_s$ column of $F_{RF}$;

$F_{RF_{N_s-1}}$ is the sub-matrix of $F_{RF}$ formed by removing $f_{RF_{N_s}}$.

(17) can be further decomposed as:

$$\log_2 \left| I_{N_S} + \frac{\rho}{\sigma^2 N_s} F_{RF}^H R F_{RF} \right| = \sum_{n=1}^{N_{RF}^T} \log_2 \left| 1 + \frac{\rho}{\sigma^2 N_s} f_{RF_n}^H Q^H T_n^{-1} Q f_{RF,n} \right| \quad (21)$$

where:

$$T_n = I_{N_S} + \frac{\rho}{\sigma^2 N_s} Q F_{RF_{n-1}} F_{RF_{n-1}}^H Q$$

$F_{RF_{n-1}}$ is a sub-matrix of $F_{RF}$ formed by removing the n'th column $f_{RF_n}$; and $T_1 = I_{N_s}$ Equation (21) suggest that the optimization of the analog precoders can be decomposed into $N_{RF}^T$ sub-problems, where each sub-problem optimises the parameters of a respective coupling unit, or equivalently a respective set of phase shifter modules. Optimizing the parameters of the coupling unit refers to determining the parameters of the phase shifter modules that optimize the sub-rate (i.e. the achievable data rate) for the sub-array of antennas selected by the coupling unit.

The optimized parameters of coupling unit n are determined by the following equation:

$$f_{RF_n}^{opt} = \underset{f_{RF_n}}{\arg\max} \log_2 \left( 1 + \frac{\rho}{\sigma^2 N_s} f_{RF_n}^H G_n f_{RF_n} \right) \quad (22)$$

where $G_n = H^H T_n^{-1} H$.

The parameters of a coupling unit might be the phase shifts applied by each phase shifter module of that coupling unit. In the examples above, each phase shifter module includes two phase shifters, and thus the parameters for a coupling unit may specify the phase shift applied by each phase shifter pair of each phase shifter module in that coupling unit.

In this example, $f_{RF_n}$ is a vector of phase values that indicate the phase shift to be applied by the phase shifter modules of coupling unit n. The elements of $f_{RF_n}$ are complex numbers in the form $ae^{j\phi}$, where $a<1$, from which it can be shown that the phase shifts $\phi_1$ and $\phi_2$ to be applied by the two phase shifters of a phase shifter module are given by:

$$\phi_1 = \cos^{-1}\left(\frac{a}{2}\right) \quad (23)$$

$$\phi_2 = \phi - \cos^{-1}\left(\frac{a}{2}\right) \quad (24)$$

Figure 7:
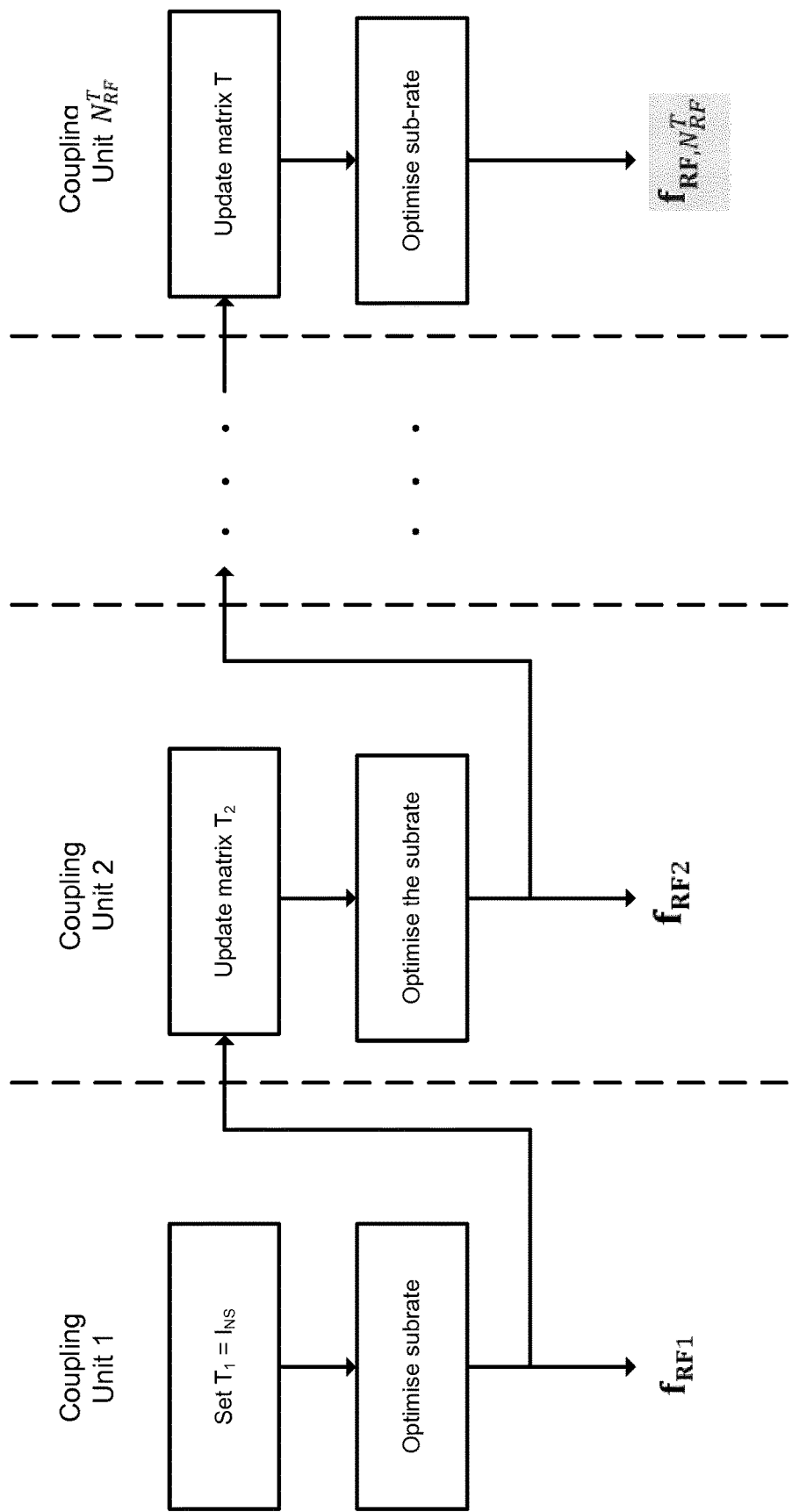
FIG. 7 illustrates an approach to performing beamspace precoding.

The process of solving each sub-problem according to equation (22) is illustrated schematically in FIG. 7.

Initially, the sub-rate of the first coupling unit is optimized (by solving (22)) to determine the value of $f_{RF1}$, which is indicative of the parameters for controlling the phase shifter modules of the first coupling unit. Those parameters are then used to determine the matrix $T_2$ for the second coupling unit. The matrix $T_2$ is used to optimize the sub-rate for the second coupling unit (by solving (22)) to determine the value of $f_{RF2}$, which is indicative of the parameters for controlling the phase shifter modules of the second coupling unit. The process is then repeated until parameters have been determined for the phase shifter modules of all $N_{RF}^T$ coupling units. Thus, the parameters for controlling the phase shifter modules of the coupling units are determined for the coupling units sequentially, i.e. the parameters for one coupling unit of the sequence are determined from the parameters for the preceding coupling unit in the sequence.

Thus, in general, the parameters for the phase shifter modules of coupling unit n are determined by:

1) receiving the value $f_{RF_{n-1}}$ indicating the phase shifter module parameters for the $(n-1)^{th}$ coupling unit;

2) Updating matrix $T_n$ using the phase shifter module parameters for the $(n-1)^{th}$ coupling unit;

3) Optimizing the sub-rate for the n'th coupling unit using the matrix $T_n$; and 4) Determining the parameters for the phase shifter modules of coupling unit n as the parameters that optimize the sub-rate.

1) to 4) are repeated until the parameters for the phase shifter modules of all $N_{RF}^T$ coupling units have been determined.

Figure 8:
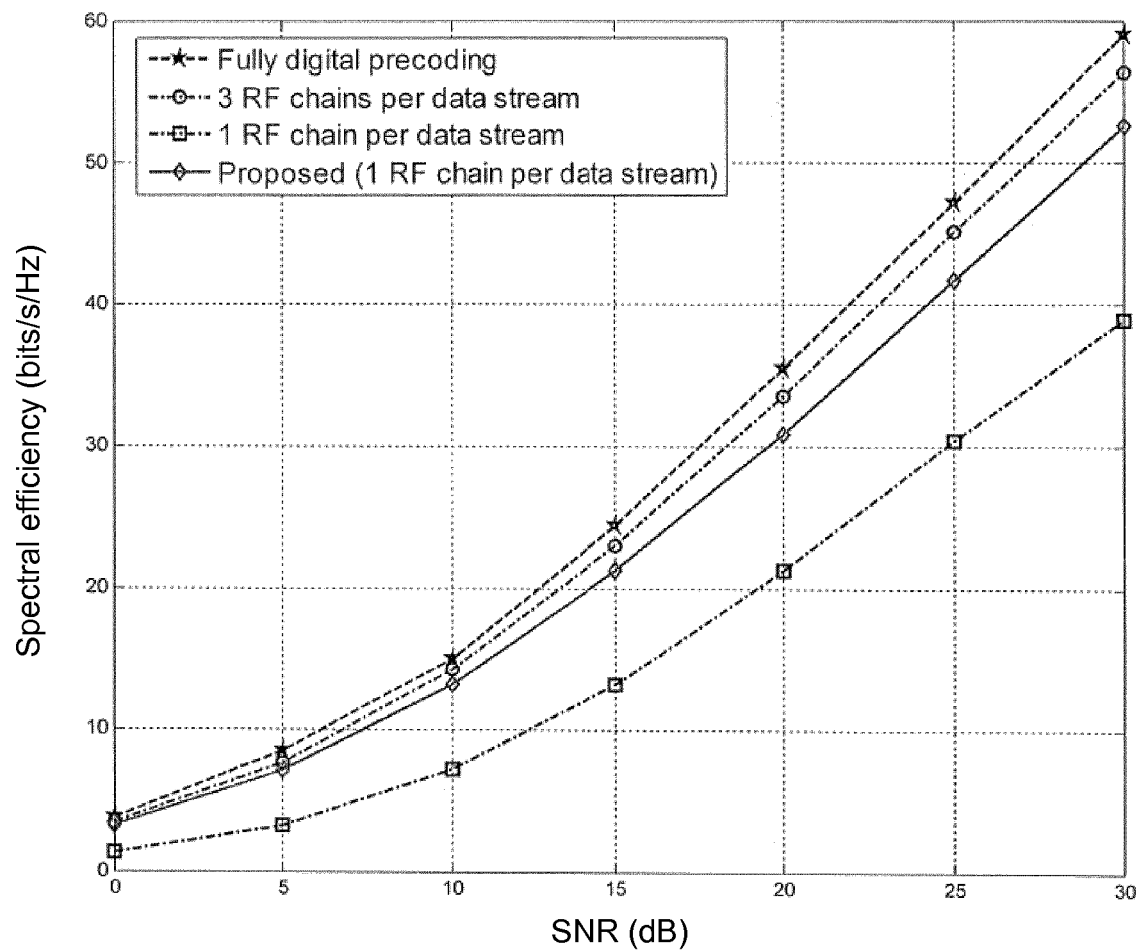
FIG. 8 shows simulation results comparing data rates achieved by the MIMO architectures described herein with conventional MIMO architectures.

The MIMO systems with lens antenna arrays described herein enable improved data rates to be achieved over a wideband channel compared to conventional MIMO systems with lens antenna arrays without increasing the number of RF chains. FIG. 8 shows simulation results obtained by the inventor with a MIMO transmitter and receiver with the architectures described herein. In this simulation, the transmitter employs an $N_T$=64 element lens antenna array, $N_{RR}^T$=8 RF chains to transmit $N_s$=8 data streams, while the receiver employs an $N_R$=64 element lens antenna array, $N_{RF}^R$=8 RF chains. The channel is assumed to have 8 resolvable paths. The gain of each path follows. The physical AoA and AoD of each path follow the independent and identically distributed random distribution within the range $$\left[-\frac{\pi}{2}, \frac{\pi}{2}\right].$$

The maximum delay of all paths is 100 ns, and the delay of each path is uniformly distributed within [0, 100 ns]. The carrier frequency is $f_c$=28 GHz, the number of sub-carriers is K=128, and the bandwidth is 2 GHz.

With these parameters, the number of beams, or antennas, $N_T^{B_{RF}}$ selected for each RF chain as specified by equations (12) and (13) is 3. Thus, three beams/antennas are selected for each RF chain. FIG. 8 shows the comparison of achievable data rates between the architecture in accordance with the existing architecture and the architecture in accordance with the present disclosure. The full digitally precoded architecture is also included as an upper-bound. We can see from FIG. 8 that the architecture described herein can achieve better performance than the traditional architecture with 1 RF chain per data stream. It can also achieve a level of performance quite close to the traditional architecture with 3 RF chains per data stream. Thus, the MIMO architectures described herein are able to achieve good performance with limited additional hardware cost and energy consumption.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A multiple-input-multiple-output (MIMO) transmitter for transmitting wireless communication signals over a wideband communication channel to a receiver, the MIMO transmitter comprising:
    a digital signal processor configured to perform precoding on a plurality $N_s$ of data streams;
    a plurality $N_{RF}$ of radio-frequency (RF) chains each configured to pass a pre-coded data stream from the digital signal processor to generate a signal representing that pre-coded data stream;
    a lens antenna array comprising an array of $N_T$ antenna elements; and
    a selecting unit coupled between the plurality of $N_{RF}$ of RF chains and the lens antenna array, the selecting unit comprising a plurality of separate coupling units each configured to couple a respective RF chain to a selective sub-array of $N_T^{B_{RF}}$ antenna elements concurrently for transmitting the signal representing the pre-coded data stream passed through that RF chain,
    wherein each coupling unit further comprises a set of phase shifter modules configured to adjust at least one of an amplitude or a phase of each selected wireless communication signal to be communicated via that RF chain, and wherein each phase shifter module comprises two phase shifters.

2. The MIMO transmitter as claimed in claim 1, wherein the selecting unit comprises $N_{RF}$ coupling units, each coupling unit coupled to a respective RF chain.

3. The MIMO transmitter as claimed in claim 1, wherein each coupling unit comprises a set of switching elements for coupling the respective RF chain to a selective sub-array of $N_T^{B_{RF}}$ of antenna elements concurrently.

4. The MIMO transmitter as claimed in claim 3, wherein each switching element in a set of switching elements corresponding to an RF chain couples that RF chain to a respective antenna element.

5. The MIMO transmitter as claimed in claim 3, wherein each set of switching elements is formed of $$N_T^{B_{RF}} = \left\lceil \frac{N_T B}{2 f_c} \right\rceil$$

switching elements, where B is a bandwidth of the wideband communication channel in Hertz, and $f_c$=c/2d, where c is a speed of light in meters per second and d is a spacing between successive antenna elements in meters.

6. The MIMO transmitter as claimed in claim 3, wherein the set of phase shifter modules of each coupling unit are coupled between the respective RF chain and the set of switching elements for that coupling unit.

7. The MIMO transmitter as claimed in claim 1, wherein the number of phase shifter modules in each coupling unit is equal to the number of switching elements in that coupling unit.

8. The MIMO transmitter as claimed in claim 1, wherein each coupling unit contains $$N_T^{B_{RF}} = \left\lceil \frac{N_T B}{2 f_c} \right\rceil$$

phase shifter modules, where B is a bandwidth of the wideband communication channel in Hertz, and $f_c=c/2d$, where c is a speed of light in meters per second and d is an antenna spacing in meters.

9. The MIMO transmitter as claimed in claim 1, wherein the number of data streams is less than or equal to the number of RF chains.

10. The MIMO transmitter as claimed in claim 1, wherein the number of RF chains is less than the number of antenna elements in the antenna lens array.

11. The MIMO transmitter as claimed in claim 3, wherein the MIMO transmitter further comprises a controller configured to control the set of switching elements in each coupling unit to select the sub-array of $N_T^{B_{RF}}$ antenna elements to be coupled to the respective RF chain.

12. The MIMO transmitter as claimed in claim 11, wherein the controller is configured to select the sub-array of $N_T^{B_{RF}}$ antenna elements to be coupled to each RF chain from the $N_T^B$ largest diagonal elements of $\Sigma_{k=1}^{K}\tilde{H}^H[k]\tilde{H}[k]$, where K is a number of sub-carriers of the MIMO transmitter, $\tilde{H}[k]$ is a beamspace channel between the MIMO transmitter and a receiver and $N_T^B=N_T^{B_{RF}}\cdot N_{RF}$.

13. The MIMO transmitter as claimed in claim 12, wherein $\tilde{H}[k]=U_R^H H[k]U_T$, where $U_T$ and $U_R$ are spatial discrete Fourier transform matrices represented by the lens antenna array at the MIMO transmitter and a lens antenna array at the receiver.

14. The MIMO transmitter as claimed in claim 1, wherein the set of phase shifter modules for each of a sequence of coupling units applies phase shift values determined from phase shift values applied by a set of phase shifter modules for a previous coupling unit in the sequence.

15. The transmitter as claimed in claim 14, wherein the set of phase shifter modules for the previous coupling unit in the sequence optimizes the data rate achievable by the sub-array of antenna elements coupled to that coupling unit.

16. The MIMO transmitter as claimed in claim 15, wherein the set of phase shifter modules for a coupling unit n in the subset of coupling units applies phase shift values indicated by a vector $f_{RFn}^{opt}$ determined according to the equation $$f_{RFn}^{opt} = \underset{f_{RFn}}{\mathrm{argmax}}\ \log_2\left(1 + \frac{\rho}{\sigma^2 N_s} f_{RFn}^H G_n f_{RFn}\right),$$

where $\rho$ is an average received power at the receiver, $\sigma^2$ is a variance of noise in the signal received at the receiver, $G_n=H^H T_n^{-1} H$, $$T_n = 1_{N_{RF}} + \frac{\rho}{\sigma^2 N_{RF}} Q F_{RFn-1} F_{RFn-1}^H Q,$$

$I_{N_{RF}}$ is an identity matrix, $F_{RFn-1}$ is a sub-matrix of a matrix of phase values $F_{RF}$ formed by removing n'th column $f_{RFn}$ and Q is a matrix formed from a decomposition of a matrix $R=Q^H Q$, where $$R = \frac{1}{K}\sum_{k=1}^{K}\tilde{H}_r^H[k]\tilde{\mathbf{H}_r}[k]$$

and $\tilde{H}_r[k]$ is a reduced-dimension beamspace channel after sub-arrays of antenna elements have been selected for each coupling unit and K is a number of sub-carriers over which signals are transmitted.

17. A MIMO system comprising the MIMO transmitter as claimed in claim 1 and a MIMO receiver comprising:
a lens antenna array comprising a set of $N_R$ antenna elements each arranged to receive a wireless communication signal;
a selecting unit coupled to the lens antenna array, the selecting unit comprising a plurality of separate coupling units each configured to couple to a selective sub-array of $N_R^{B_{RF}}$ antenna elements concurrently to select $N_R^{B_{RF}}$ received wireless communication signals, wherein each coupling unit further comprises a set of phase shifter modules configured to adjust at least one of an amplitude or a phase of each selected wireless communication signal;
a plurality $N_{RF}$ of radio-frequency (RF) chains each coupled to a respective coupling unit, each RF chain being configured to pass a signal received from its respective coupling unit to generate a digital signal; and
a digital signal processor configured to receive the digital signals generated from each RF chain and to perform combining of those signals to generate a plurality $N_s$ of data streams.

18. A method of selecting a sub-array of antennas to be coupled to each RF chain of a multiple-input-multiple-output (MIMO) transmitter as claimed in claim 1, the method comprising:
selecting $N_T^B$ largest diagonal elements of $\Sigma_{k=1}^{K}\tilde{H}^H[k]\tilde{H}[k]$ to form a vector $S_T$ indicating $N_T^B$ most powerful beams transmitted by the lens antenna array of the MIMO transmitter, where K is a number of sub-carriers of the MIMO transmitter, $\tilde{H}[k]$ is a beamspace channel between the MIMO transmitter and a receiver and $N_T^B=N_T^{B_{RF}}\cdot N_{RF}^T$, where $N_T^{B_{RF}}$ is a number of antenna elements in each sub-array and $N_{RF}^T$ is a number of RF chains in the MIMO transmitter.

19. A method of selecting a sub-array of antennas to be coupled to each RF chain of the MIMO transmitter and the MIMO receiver as claimed in claim 18, the method comprising:
selecting $N_T^B$, largest diagonal elements of $\Sigma_{k=1}^{K}\tilde{H}^H[k]\tilde{H}[k]$ to form a vector $S_T$ indicating the $N_T^B$, most powerful beams transmitted by the lens antenna array of the MIMO transmitter, where K is a number of sub-carriers of the MIMO transmitter, $\tilde{H}[k]$ is a beamspace channel between the MIMO transmitter and the MIMO receiver and $N_T^B=N_T^{B_{RF}}\cdot N_{RF}^T$, where $N_T^{B_{RF}}$ is a number of antenna elements in each sub-array and $N_{RF}^T$ is a number of RF chains in the transmitter; and
selecting $N_R^B$ largest diagonal elements of $\Sigma_{k=1}^{K}\tilde{H}^H[k]\tilde{H}[k]$ to form a vector $S_R$ indicating the $N_T^B$ most powerful beams received by the lens antenna array of the MIMO receiver.

20. A method of configuring the set of phase shifter modules for the plurality of coupling units of the MIMO transmitter as claimed in claim 1, comprising:
determining the phase shift values applied by the set of phase shifter modules for a sequence of coupling units, wherein the phase shift values applied by the set of phase shifter modules of a coupling unit in the sequence is determined from phase shift values applied by the set of phase shifter modules of the previous coupling unit in the sequence.

21. The method as claimed in claim 19, wherein the set of phase shifter modules for the previous coupling unit in the sequence optimize the data rate achievable by the sub-array of antenna elements coupled to that coupling unit.

22. The method as claimed in claim 21, wherein the set of phase shifter modules for a coupling unit n in the sequence of coupling units applies phase shift values $f_{Rfn}^{opt}$ determined according to the equation $$f_{RFn}^{opt} = \underset{f_{RFn}}{\mathrm{argmax}}\, \log_2\left(1 + \frac{\rho}{\sigma^2 N_s} f_{RFn}^H G_n f_{RFn}\right),$$

where $\rho$ is an average received power at the receiver, $\sigma^2$ is variance of the noise in the signal received at the receiver, $G_n = H^H T_n^{-1} H$, $$T_n = I_{N_{RF}} + \frac{\rho}{\sigma^2 N_{RF}} Q F_{RFn-1} F_{RFn-1}^H Q,$$

$I_{N_{RF}}$ is an identity matrix, $F_{RFn-1}$ is a sub-matrix of a matrix of phase values $F_{RF}$ formed by removing an n'th column $f_{RFn}$ and Q is a matrix formed from a decomposition of a matrix $R = Q^H Q$, where $$R = \frac{1}{K} \sum_{k=1}^{K} \tilde{H}_r^H[k] \tilde{\mathbf{H}}_r[k]$$

and $\tilde{H}_r[k]$ is a reduced-dimension beamspace channel after sub-arrays of antenna elements have been selected for each coupling unit and K is a number of sub-carriers over which signals are transmitted.

23. A multiple-input-multiple-output (MIMO) receiver for receiving wireless communication signals over a wideband communication channel, the MIMO receiver comprising:
a lens antenna array comprising a set of $N^R$ antenna elements each arranged to receive a wireless communication signal;
a selecting unit coupled to the lens antenna array, the selecting unit comprising a plurality of separate coupling units each configured to couple to a selective sub-array of $N_R^{B_{RF}}$ antenna elements concurrently to select $N_R^{B_{RF}}$ received wireless communication signals, wherein each coupling unit further comprises a set of phase shifter modules configured to adjust at least one of an amplitude or a phase of each selected wireless communication signal, and wherein each phase shifter module comprises two phase shifters;
a plurality $N_{RF}$ of radio-frequency (RF) chains each coupled to a respective coupling unit, each RF chain being configured to pass a signal received from its respective coupling unit to generate a digital signal; and
a digital signal processor configured to receive the digital signals generated from each RF chain and to perform combining of those signals to generate a plurality $N_s$ of data streams.

* * * * *

UNITED STATES PATENT AND TRADEMARK OFFICE
CERTIFICATE OF CORRECTION

PATENT NO. : 11,838,079 B2
APPLICATION NO. : 17/250977
DATED : December 5, 2023
INVENTOR(S) : Linglong Dai et al.

It is certified that error appears in the above-identified patent and that said Letters Patent is hereby corrected as shown below:

On the Title Page

In item (56), in Column 2, under "Other Publications", Line 3, delete "4,Jun." and insert -- 4, Jun. --.

On the page 2, in Column 2, under "Other Publications", Line 12, delete "074532dated" and insert -- 074532 dated --.

On the page 2, in Column 2, under "Other Publications", Line 19, delete "mmWa e Massi e" and insert -- mmWave Massive --.

On the page 2, in Column 2, under "Other Publications", Line 50, delete "DOI: 10.1 1 O9/TCOMM.201 7.2762689," and insert -- DOI:10.1109/TCOMM.2017.2762689, --.

In the Specification

In Column 2, Line 48, delete "$f_c=c/2\ d$," and insert -- $f_c=c/2d$, --.

In Column 3, Line 2, delete "$f_c=c/2\ d$," and insert -- $f_c=c/2d$, --.

In Column 4, Line 30, delete "$f_c=c/2\ d$," and insert -- $f_c=c/2d$, --.

In Column 4, Line 51, delete "$f_c=c/2\ d$," and insert -- $f_c=c/2d$, --.

In Column 9, Line 34, delete "$U_T=[a_T(\phi_T^1),a_T(\phi_T^2),\ldots,a_T(\phi_T^{NT})]$" and insert -- $U_T=[a_T(\phi_T^1),a_T(\phi_T^2),\ldots,a_T(\phi_T^{NT}),]$ --.

In Column 11, Line 44, delete "NF," and insert -- $N_T^B$, --.

In Column 14, Line 56, delete "Y[k]" and insert -- y[k] --.

Signed and Sealed this
Twenty-first Day of May, 2024

Katherine Kelly Vidal
*Director of the United States Patent and Trademark Office*

CERTIFICATE OF CORRECTION (continued)
U.S. Pat. No. 11,838,079 B2

In Column 15, Line 37, delete "$\Sigma_{k=1}^{K}\text{H}^{H}[k]\tilde{\text{H}}^{H}[k]$." and insert -- $\sum_{k=1}^{K} \widetilde{\mathbf{H}}^H[k]\widetilde{\mathbf{H}}[k]$ --.

In Column 15, Line 63, after "$\Sigma_{k=1}^{K}\tilde{\text{H}}[k]\text{S}_T*\text{S}_T*^H\tilde{\text{H}}^H[k]$" insert -- . --.

In Column 17, Line 30, delete "$\log_2 \left| I_{N_S} + \frac{\rho}{\sigma^2 N_s} F_{RF}^H \left( \frac{1}{K} \sum_{k=1}^{K} \widetilde{H}_r^H[k]\overline{H}_r[k] \right) F_{RF} \right|$"
and insert -- $\log_2 \left| \mathbf{I}_{N_S} + \frac{\rho}{\sigma^2 N_s} \mathbf{F}_{RF}^H \left( \frac{1}{K} \sum_{K=1}^{K} \widetilde{\mathbf{H}}_r^H[k]\widetilde{\mathbf{H}}_r[k] \right) \mathbf{F}_{RF} \right|$ --.

In Column 19, Line 26, delete "$N_{RR}^T=8$" and insert -- $N_{RF}^T=8$ --.

In the Claims

In Column 22, Line 41, in Claim 19, delete "$N_T^B$," and insert -- $N_T^B$ --.

In Column 22, Line 42, in Claim 19, delete "$N_T^B$," and insert -- $N_T^B$ --.

In Column 22, Lines 50-51, in Claim 19, delete "$\Sigma_{k=1}^{K}\tilde{\text{H}}^H[k]\tilde{\text{H}}[k]$" and insert -- $\sum_{k=1}^{K} \widetilde{H}^H[k]s_T s_T^H \widetilde{H}[k]$ --.

In Column 23, Line 9, in Claim 22, delete "$f_{RFn}^{opt} = \underset{f_{RFn}}{\text{argmax}} \log_2 \left( 1 + \frac{\rho}{\sigma^2 N_x} f_{RFn}^H G_n f_{RFn} \right),$" and insert -- $f_{RFn}^{opt} = \frac{argmax \, log_2}{f_{RFn}}(1 + \frac{\rho}{\sigma^2 N_s} f_{RFn}^H G_n f_{RFn}),$ --.

In Column 24, Line 9, in Claim 23, delete "$N^R$" and insert -- $N_R$ --.